US012674857B2

(12) United States Patent
Saha et al.

(10) Patent No.: US 12,674,857 B2
(45) Date of Patent: Jul. 7, 2026

(54) BROADCASTING POSITIONING ASSISTANCE DATA FOR AERIAL USER EQUIPMENT

(71) Applicant: QUALCOMM Incorporated, San Diego, CA (US)

(72) Inventors: Chiranjib Saha, Lakeside, CA (US); Alberto Rico Alvarino, San Diego, CA (US); Le Liu, San Jose, CA (US); Kazuki Takeda, Tokyo (JP); Alexandros Manolakos, Escondido, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 18/548,183

(22) PCT Filed: Apr. 14, 2022

(86) PCT No.: PCT/US2022/024910
§ 371 (c)(1),
(2) Date: Aug. 28, 2023

(87) PCT Pub. No.: WO2022/250805
PCT Pub. Date: Dec. 1, 2022

(65) Prior Publication Data
US 2024/0302482 A1 Sep. 12, 2024

(30) Foreign Application Priority Data
May 28, 2021 (GR) .............................. 20210100357

(51) Int. Cl.
*G01S 5/02* (2010.01)
*G01S 5/10* (2006.01)
(Continued)

(52) U.S. Cl.
CPC .............. *G01S 5/0236* (2013.01); *G01S 5/10* (2013.01); *H04W 36/322* (2023.05); *H04W 84/06* (2013.01)

(58) Field of Classification Search
CPC ...... G01S 5/0236; G01S 5/10; G01S 2205/03; H04W 36/322; H04W 84/06;
(Continued)

(56) References Cited

U.S. PATENT DOCUMENTS

| | | | | |
|---|---|---|---|---|
| 11,290,931 B2 * | 3/2022 | Wei | ..................... | H04W 36/322 |
| 2020/0053690 A1 * | 2/2020 | Fischer | .................. | G01S 19/05 |

(Continued)

FOREIGN PATENT DOCUMENTS

WO 2019110709 A1 6/2019

OTHER PUBLICATIONS

International Search Report and Written Opinion—PCT/US2022/024910—ISA/EPO—Jul. 20, 2022.

*Primary Examiner* — Kenneth T Lam
(74) *Attorney, Agent, or Firm* — Weaver Austin Villenueve & Sampson LLP

(57) ABSTRACT

Positioning assistance data is broadcast by Transmission Reception Points (TRPs) that includes information that is specific for aerial user equipment (UEs) and information that is for terrestrial UEs. The positioning assistance data may be included in positioning System Information Blocks (pos-SIBs), and the information for the aerial UEs and information for the terrestrial UEs may be provided together in the posSIB or may be provided in separate posSIBs. The positioning assistance data, for example, may separately list, e.g., the TRPs, resource sets, or resources to be used for positioning aerial UEs.

36 Claims, 11 Drawing Sheets

(51) Int. Cl.
    *H04W 36/32*      (2009.01)
    *H04W 84/06*      (2009.01)

(58) Field of Classification Search
    CPC .... H04W 64/00; H04W 48/10; H04L 5/0035;
             H04L 5/005; H04L 5/0053; H04L 5/0048;
                  H04B 7/0617; B64U 2101/00
    See application file for complete search history.

(56)                 References Cited

U.S. PATENT DOCUMENTS

| | | | |
|---|---|---|---|
| 2020/0264261 A1 | 8/2020 | Akkarakaran et al. | |
| 2020/0413369 A1* | 12/2020 | Wei | H04W 72/30 |
| 2021/0068028 A1* | 3/2021 | Wei | H04W 36/322 |
| 2021/0195479 A1* | 6/2021 | Wei | H04W 36/0061 |
| 2024/0019525 A1* | 1/2024 | Thomas | H04W 64/00 |
| 2024/0098679 A1* | 3/2024 | Ghimire | H04W 24/10 |

* cited by examiner

GNSS
Satellites
110
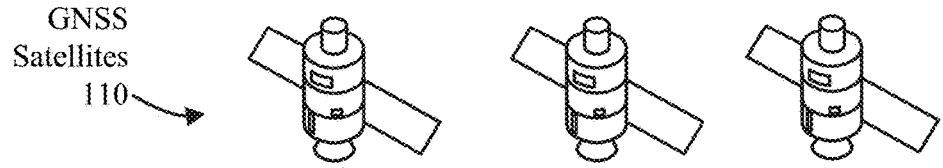
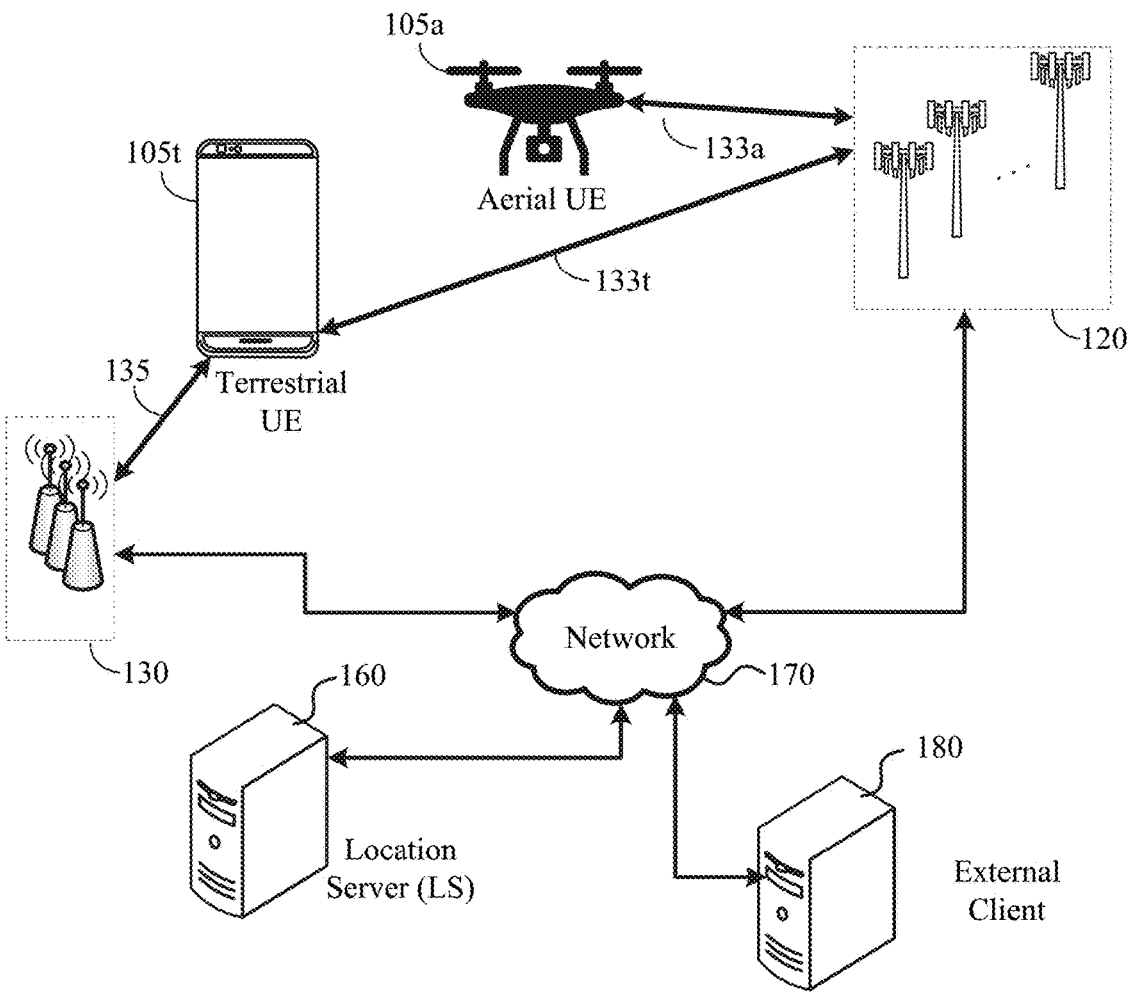
105a
Aerial UE
133a
105t
133t
120
Terrestrial
UE
135
130
Network
160
170
180
Location
Server (LS)
External
Client
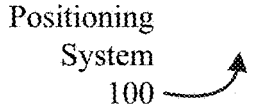
Positioning
System
100
FIG. 1

500

502

1000 —↘

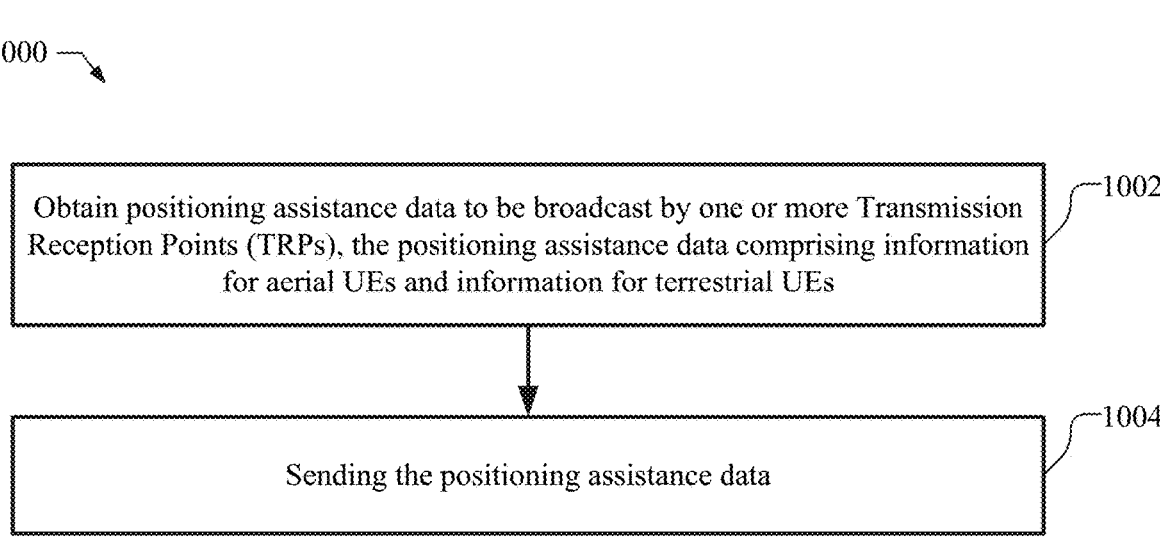

┌──────────────────────────────────────────────────────────────────────┐
│ Obtain positioning assistance data to be broadcast by one or more Transmission │ ⌐1002
│ Reception Points (TRPs), the positioning assistance data comprising information │
│ for aerial UEs and information for terrestrial UEs │
└──────────────────────────────────────────────────────────────────────┘

┌──────────────────────────────────────────────────────────────────────┐
│                    Sending the positioning assistance data                    │ ⌐1004
└──────────────────────────────────────────────────────────────────────┘

```
Receive positioning assistance data broadcast by a Transmission Reception    ┌─1102
Points (TRP), the positioning assistance data comprising information for aerial
UEs and information for terrestrial UEs
```

```
Obtain downlink measurements using the positioning assistance data    ┌─1104
```

BROADCASTING POSITIONING ASSISTANCE DATA FOR AERIAL USER EQUIPMENT

CROSS-REFERENCE TO RELATED APPLICATION

This application is a National Phase entry of International Application No. PCT/US2022/024910, filed Apr. 14, 2022, entitled "BROADCASTING POSITIONING ASSIS-TANCE DATA FOR AERIAL USER EQUIPMENT", which claims the benefit of Greek Patent Application No. 20210100357, entitled "BROADCASTING POSITIONING ASSISTANCE DATA FOR AERIAL USER EQUIPMENT," filed May 28, 2021, both of which are assigned to the assignee hereof and expressly incorporated herein by reference in their entirety.

BACKGROUND

Field

The subject matter disclosed herein relates generally to the field of wireless communications, and more specifically to positioning of a User Equipment (UE) in a wireless network.

Information

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (5G NR). 5G NR is part of a continuous mobile broadband evolution promulgated by Third Generation Partnership Project (3 GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5GNR technology. These improvements may also be applicable to other multi-access technologies and the telecommunication standards that employ these technologies.

For example, obtaining the location of a UE that is accessing a wireless network may be useful for many applications including, for example, navigation, emergency calls, asset tracking, locating a friend or family member, etc. A UE located in an aerial vehicle, sometimes referred to herein as an aerial UE, however, may use different positioning signals than may be used to terrestrial UEs. Thus, improvements in positioning operations to accommodate aerial UEs in addition to terrestrial UEs may be desired.

SUMMARY

Positioning assistance data is broadcast by Transmission Reception Points (TRPs) that includes information that is specific for aerial user equipment (UEs) and information that is for terrestrial UEs. The positioning assistance data may be included in positioning System Information Blocks (pos-SIBs), and the information for the aerial UEs and information for the terrestrial UEs may be provided together in the posSIB or may be provided in separate posSIBs. The positioning assistance data, for example, may separately list, e.g., the TRPs, resource sets, or resources to be used for positioning aerial UEs.

In one implementation, a method performed by a network entity in a wireless network for positioning one or more user equipments (UEs) including an aerial UE, includes obtaining positioning assistance data to be broadcast by one or more Transmission Reception Points (TRPs), the positioning assistance data comprising information for aerial UEs and information for terrestrial UEs; and sending the positioning assistance data.

In one implementation, a network entity in a wireless network configured for positioning one or more user equipments (UEs) including an aerial UE, includes an external interface configured to communicate with entities in the wireless network; at least one memory; and at least one processor coupled to the external interface and the at least one memory and configured to: obtain, via the external interface, positioning assistance data to be broadcast by one or more Transmission Reception Points (TRPs), the positioning assistance data comprising information for aerial UEs and information for terrestrial UEs; and send, via the external interface, the positioning assistance data.

In one implementation, a network entity in a wireless network configured for positioning one or more user equipments (UEs) including an aerial UE, comprising: means for obtaining positioning assistance data to be broadcast by one or more Transmission Reception Points (TRPs), the positioning assistance data comprising information for aerial UEs and information for terrestrial UEs; and means for sending the positioning assistance data.

In one implementation, a non-transitory storage medium including program code stored thereon, the program code is operable to configure at least one processor in a network entity in a wireless network for positioning one or more user equipments (UEs) including an aerial UE, the program code comprising instruction to: obtain positioning assistance data to be broadcast by one or more Transmission Reception Points (TRPs), the positioning assistance data comprising information for aerial UEs and information for terrestrial UEs; and send the positioning assistance data.

In one implementation, a method performed by a user equipment (UE) in a wireless network for positioning, includes receiving positioning assistance data broadcast by a Transmission Reception Points (TRP), the positioning assistance data comprising information for aerial UEs and information for terrestrial UEs; and obtaining downlink measurements using the positioning assistance data.

In one implementation, a user equipment (UE) in a wireless network configured for positioning, includes a wireless transceiver configured to communicate with entities in the wireless network; at least one memory; and at least one processor coupled to the wireless transceiver and the at least one memory and configured to: receive, via the wireless transceiver, positioning assistance data broadcast by a Transmission Reception Points (TRP), the positioning assistance data comprising information for aerial UEs and information for terrestrial UEs; and obtain, via the wireless transceiver, downlink measurements using the positioning assistance data.

In one implementation, a user equipment (UE) in a wireless network configured for positioning, comprising: means for receiving positioning assistance data broadcast by a Transmission Reception Points (TRP), the positioning assistance data comprising information for aerial UEs and information for terrestrial UEs; and means for obtaining downlink measurements using the positioning assistance data.

In one implementation, a non-transitory storage medium including program code stored thereon, the program code is operable to configure at least one processor in a user equipment (UE) in a wireless network for positioning, the program code comprising instruction to: receive positioning assistance data broadcast by a Transmission Reception Points (TRP), the positioning assistance data comprising information for aerial UEs and information for terrestrial UEs; and obtain downlink measurements using the positioning assistance data.

BRIEF DESCRIPTION OF THE FIGURES

Claimed subject matter is particularly pointed out and distinctly claimed in the concluding portion of the specification. However, both as to organization and/or method of operation, together with features and/or advantages thereof, it may best be understood by reference to the following detailed description if read with the accompanying drawings in which:

FIG. 1 is a diagram of a positioning system, according to an embodiment.

FIG. 10 shows a flow diagram for an exemplary method performed by a network entity in wireless network for positioning one or more UEs including an aerial UE.

Figure 2:
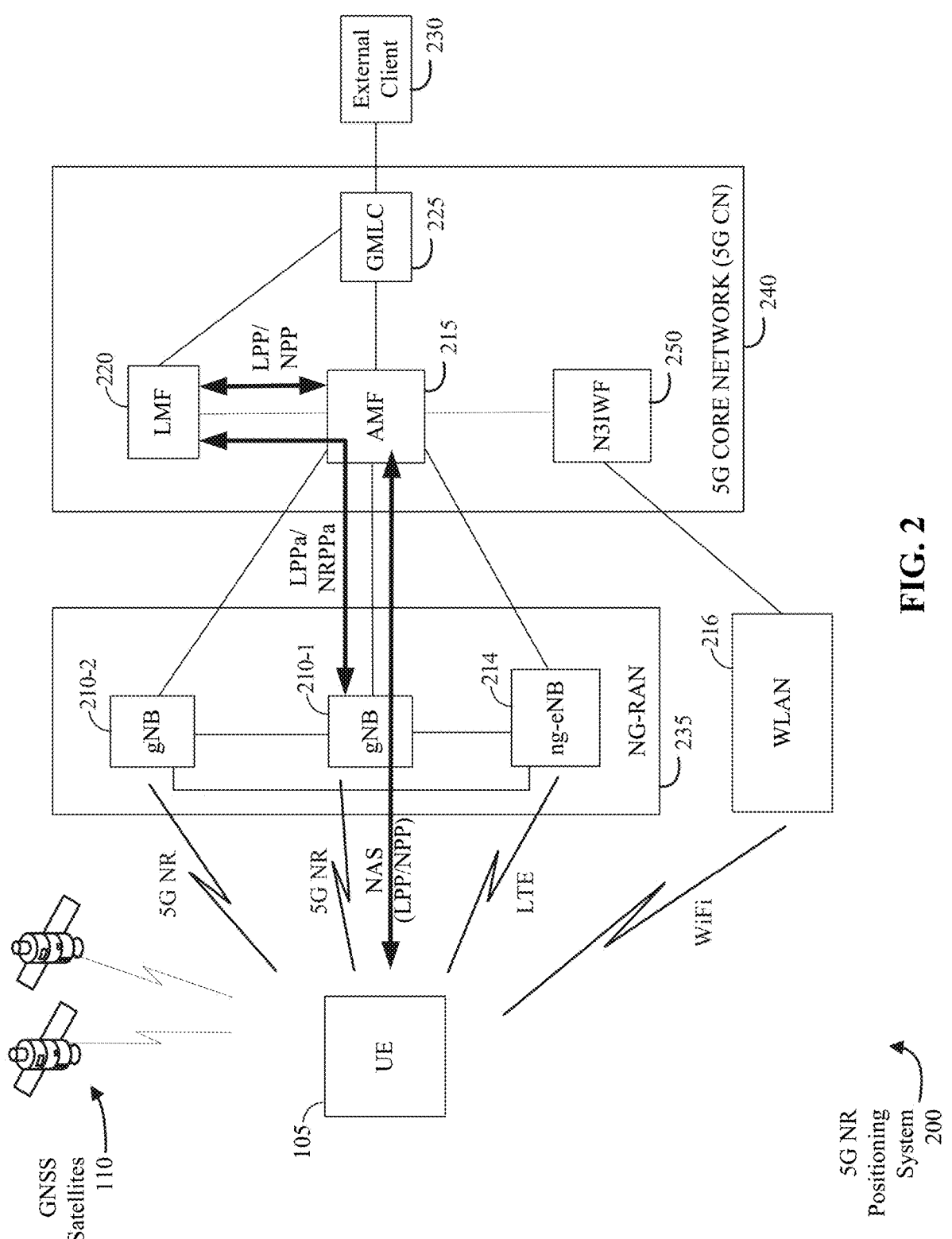
FIG. 2 is a diagram of a 5th Generation (5G) New Radio (NR) positioning system, illustrating an embodiment of a positioning system (e.g., the positioning system of FIG. 1) implemented within a 5G NR communication system.

Like reference symbols in the various drawings indicate like elements, in accordance with certain example implementations. In addition, multiple instances of an element may be indicated by following a first number for the element with a letter or a hyphen and a second number. For example, multiple instances of an element 210 may be indicated as 210-1, 210-2, 210-3 etc. or as 210a, 210b, 210c, etc. When referring to such an element using only the first number, any instance of the element is to be understood (e.g., element 210 in the previous example would refer to elements 110-1, 210-2, and 210-3 or to elements 210a, 210b, and 210c).

It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "one or more processors configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, consumer tracking device for tracking consumer items, packages, assets, or entities such as individuals and pets, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). A UE may be located in an aerial vehicle such as an unmanned aerial vehicle (UAV), a drone, helicopter, multi-rotor copter (e.g., quadcopter), balloon, blimp, dirigible, fixed-wing aircraft, or any other vehicle capable of flying and, which may be controlled remotely. A UE located in an aerial vehicle is sometimes referred to herein as an aerial UE. In contrast, a terrestrial UE may be any non-aerial UE. As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server (LS) to support positioning. The location server may be part of or accessible from a serving network or a home network for a UE or may simply be accessible over the Internet or over a local Intranet. If positioning of a UE is needed, a location server may instigate a session (e.g. a location session or a SUPL session) with the UE and coordinate location measurements by the UE and determination of an estimated location of the UE. During a location session, a location server may request positioning capabilities of the UE (or the UE may provide them to the location server without a request), may provide assistance data to the UE (e.g. if requested by the UE or in the absence of a request) and may request a location estimate or location measurements from a UE, e.g. for the Global Navigation Satellite System (GNSS), Time Difference Of Arrival (TDOA), Angle of Departure (AoD), Round-Trip Time (RTT) and multi cell RTT (Multi-RTT), and/or Enhanced Cell ID (ECID) position methods. Assistance data may be used by a UE to acquire and measure GNSS and/or reference signals, such as positioning reference signals (PRS) signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., TDOA, AoD, Multi-RTT, etc.).

In a UE assisted mode of operation, a UE may return location measurements to a location server which may determine an estimated location of the UE based on these measurements and possibly based also on other known or configured data (e.g. satellite ephemeris data for GNSS location or base station characteristics including base station locations and possibly PRS timing in the case of terrestrial positioning using, e.g., TDOA, AoD, Multi-RTT, etc.).

In another standalone mode of operation, a UE may make location related measurements without any positioning assistance data from a location server and may further compute a location or a change in location without any positioning assistance data from a location server. Position methods that may be used in a standalone mode include GPS and GNSS (e.g. if a UE obtains satellite orbital data from data broadcast by GPS and GNSS satellites themselves) as well as sensors.

In the case of 3GPP CP location, a location server may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, a location server may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

A location server and a base station (e.g. an eNodeB (eNB) for LTE access or an NR NodeB (gNB) for NR access) may exchange messages to enable the location server to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol may be used to transfer such messages between a base station that is an eNodeB and a location server that is an E-SMLC. In the case of NR access, the New Radio Position Protocol A (which may be referred to as NPPa or NRPPa) protocol may be used to transfer such messages between a base station that is a gNodeB and a location server that is an LMF. It is noted that the terms "parameter" and "information element" (IE) are synonymous and are used interchangeably herein. It is also noted that the term "posSIB", as used herein, refers to a System Information Block (SIB) which includes assistance data (also referred to as "positioning assistance data") to support positioning of one or more UEs. However, in some instances, the term "SIB" is used herein to refer to a SIB containing assistance data to support positioning of one or more UEs. It is further noted that the terms "SI messages" and "positioning SI messages" may be used interchangeably herein to refer to system information messages containing assistance data, e.g. assistance data in the form of one or more posSIBs.

During positioning using signaling in LTE and 5G NR, a UE typically acquires dedicated positioning signals transmitted by base stations, referred to as a Positioning Reference Signals (PRS), which are used to generate the desired measurements for the supported positioning technique. Positioning Reference Signals (PRS) are defined for 5G NR positioning to enable UEs to detect and measure more neighbor base stations or Transmission and Reception Points (TRPs). Other types of signals, i.e., signals that are not dedicated for positioning, may be used by the UE for positioning. Several configurations are supported to enable a variety of deployments (indoor, outdoor, sub-6, mmW). To support PRS beam operation, beam sweeping is additionally supported for PRS. Table 1 below illustrates 3GPP release numbers (e.g., Rel.16 or Rel.15) that define particular reference signals for various UE measurements and the accompanying positioning techniques.

TABLE 1

| DL/UL Reference Signals | UE Measurements | To facilitate support of the following positioning techniques |
| --- | --- | --- |
| Rel. 16 DL PRS | DL RSTD | DL-TDOA |
| Rel. 16 DL PRS | DL PRS RSRP | DL-TDOA, DL-AoD, Multi-RTT |
| Rel. 16 DL PRS/Rel. 16 SRS for positioning | UE Rx-Tx time difference | Multi-RTT |
| Rel. 15 SSB/CSI-RS for RRM | SS-RSRP(RSRP for RRM), SS-RSRQ(for RRM), CSI-RSRP (for RRM), CSI-RSRQ (for RRM) | E-CID |

During a location session, a location server and UE may exchange messages defined according to some positioning protocol in order to coordinate the determination of an estimated location. Possible positioning protocols may include, for example, the LTE Positioning Protocol (LPP) defined by 3GPP in 3GPP TS 37.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB for the UE. LPP or LPPe messages may also be exchanged between a UE and LMF via a serving Access and Mobility Management Function (AMF) and a serving NR Node B (gNB) for the UE. LPP and LPP/LPPe may also be used to help support the OMA SUPL solution for many types of wireless access that support IP messaging (such as LTE, NR, and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message.

Positioning procedures, e.g., in the NG-RAN, are modelled as transactions of the LPP protocol. A procedure, for example, consists of a single operation of one of the following types: exchange of positioning capabilities; transfer of assistance data; transfer of location information (positioning measurements and/or position estimate); error handling; and abort.

Positioning assistance data may be transferred in an unsolicited fashion by broadcasting by the base station. Broadcast of positioning assistance data is supported via Positioning System Information Blocks (posSIBs) as specified in 3GPP TS 36.331 or TS 38.331 and TS 37.355. The posSIBs are carried in Radio Resource Control (RRC) System Information (SI). A posSIB may be broadcasted by the base station, e.g., an eNB for LTE access or gNB for NR access, or a posSIB may be sent by a base station, e.g., gNB for NR access, in response to a UE request for on-demand posSIB.

Aerial UEs and terrestrial UEs may both be positioned using a wireless network. The positioning assistance data used for positioning aerial UEs, however, may be different than the positioning assistance data used for positioning terrestrial UEs. For example, some, but not all, base stations may be configured to use uptilt beams in which the main lobe of the radiation pattern of the antenna is above the horizontal plane, which would be advantageous for aerial UEs. The remaining base stations may be configured with only downtilt beams in which the main lobe of the radiation pattern of the antenna is below the horizontal plane, which is suitable for terrestrial UEs, but may provide weak signals for aerial UEs. Accordingly, the PRS resource sets or PRS resources per frequency layer per base station (TRP) may be different for aerial UEs than terrestrial UEs. Moreover, an aerial UE may have significantly more cells or base stations that are line of sight than a terrestrial UE. Accordingly, neighboring base stations participating in positioning an aerial UE may be different than neighboring base stations participating in positioning a terrestrial UE.

While UEs, including aerial UEs may request on-demand posSIBs with positioning assistance data specifically configured for the UE, currently broadcast positioning assistance data, e.g., in posSIBs, does not distinguish terrestrial UEs or aerial UEs. Accordingly, during positioning, if aerial UEs rely on broadcast positioning assistance data, the aerial UEs will use positioning assistance data that is suitable for terrestrial UEs and may not be suitable for aerial UEs.

Accordingly, in an implementation discussed herein, base stations broadcast aerial UE specific positioning assistance data. For example, broadcast positioning assistance data may include information specific for aerial UEs and information for terrestrial UEs. In some implementations, for example, the information for aerial UEs and the information for terrestrial UEs may be provided together, e.g., in the same posSIBs and in some implementations in the same list. The information for the aerial UEs, however, may be identified and in some implementations, one or more positioning assistance data components may be prioritized for positioning aerial UEs. For example, if the same PRS parameters, such as frequency layers, TRPs, resource sets, or resources, are suitable for positioning both terrestrial UEs and aerial UEs, separate priorities for the PRS parameters may be provided for terrestrial UEs and aerial UEs. In another implementation, the information for aerial UEs and the information for terrestrial UEs may be provided separately, e.g., in separate lists or separate posSIBs. If desired, a combination of techniques may be used, e.g., by providing in a single list PRS parameters that are suitable for both terrestrial UEs and aerial UEs and providing a separate list of PRS parameters suitable only for aerial UEs.

FIG. 1 is a simplified illustration of a positioning system 100 in which an aerial UE 105a, a terrestrial UE 105t, location server 160, and/or other components of the positioning system 100 can use the techniques provided herein for positioning. The aerial UE 105a and terrestrial UE 105t may sometimes be referred to herein as UEs 105. The techniques described herein may be implemented by one or more components of the positioning system 100. The positioning system 100 is illustrated with one or more satellites 110 (also referred to as space vehicles (SVs)) for a Global Navigation Satellite System (GNSS) such as the Global Positioning System (GPS), base stations 120, access points (APs) 130, location server 160, network 170, and external client 180. The terrestrial UE 105t is illustrated as being in communication with the base stations 120 and access points 130. Aerial UE 105a is illustrated as being in communication with the base stations 120, but may similarly be in communication with access points. Thus, the UE 105a and 105t may be in communication with the base stations 120, access points 130, location server 160, etc. in the same manner, and, thus, the aerial UE 105a may be the same type of UE as the terrestrial UE 105t, but is located in an aerial vehicle. Accordingly, unless indicated otherwise, it should be understood that the following discussion referring to UEs 105 may be applicable to both the aerial UE 105a and the terrestrial UE 105t.

The positioning system 100 may estimate the location of the UEs 105 based on RF signals received by and/or sent from the UEs and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only UE 105a and 105t are illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UEs 105 can send and receive information with network-connected devices, such as location server 160, by accessing the network 170 via a base station 120 using a first communication links 133a and 133t. Additionally or alternatively, because APs 130 also may be communicatively coupled with the network 170, UEs 105 may communicate with Internet-connected devices, including location server 160, using a second communication link 135.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." Physical transmission points may comprise an array of antennas (e.g., as in a Multiple Input-Multiple Output (MIMO) system and/or where the base station employs beamforming) of the base station. The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UEs 105 and a neighbor base station whose reference RF signals the UEs 105 is measuring.

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UEs 105 and/or provide data (e.g., "assistance data") to UEs 105 to facilitate the location determination. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UEs 105 based on subscription information for UEs 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UEs 105 using a control plane (CP) location solution for LTE radio access by UEs 105. The location server 160 may further comprise a Location Management Function (LMF) that supports location of UEs 105 using a control plane (CP) location solution for NR radio access by UEs 105. In a CP location solution, signaling to control and manage the location of UEs 105 may be exchanged between elements of network 170 and with UEs 105 using existing network interfaces and protocols and as signaling from the perspective of network 170. In a UP location solution, signaling to control and manage the location of UEs 105 may be exchanged between location server 160 and UEs 105 as data (e.g. data transported using the Internet Protocol (IP) and/or Transmission Control Protocol (TCP)) from the perspective of network 170.

As previously noted (and discussed in more detail below), the estimated location of UEs 105 may be based on measurements of RF signals sent from and/or received by the UEs 105. In particular, these measurements can provide information regarding the relative distance and/or angle of the UE from one or more components in the positioning system 100 (e.g., GNSS satellites 110, APs 130, base stations 120 or other sidelink UEs). The estimated location of the UE can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. Moreover, in some embodiments, location of the UEs 105 may be estimated at least in part based on measurements of RF signals communicated between UEs, e.g., between UE 105a and a sidelink UE 105 (not shown in FIG. 1), which may be mobile. Direct communication between peer UEs in this manner may comprise PC5 sidelink, and/or similar Device-to-Device (D2D) communication technologies. Sidelink, which is defined by 3GPP, is a form of D2D communication under the cellular-based LTE and NR standards. All direct communications between UEs are referred to herein as sidelink communications.

An estimated location of a UE can be used in a variety of applications—e.g. to assist direction finding or navigation for a user of the UE or to assist another user (e.g. associated with external client 180) to locate UE. A "location" is also referred to herein as a "location estimate", "estimated location", "location", "position", "position estimate", "position fix", "estimated position", "location fix" or "fix". A location of the UE may comprise an absolute location of the UE (e.g. a latitude and longitude and possibly altitude) or a relative location of the UE (e.g. a location expressed as distances north or south, east, or west and possibly above or below some other known fixed location or some other location such as a location for the UE at some known previous time). A location may also be specified as a geodetic location (as a latitude and longitude) or as a civic location (e.g. in terms of a street address or using other location related names and labels). A location may further include an uncertainty or error indication, such as a horizontal and possibly vertical distance by which the location is expected to be in error or an indication of an area or volume (e.g. a circle or ellipse) within which the UE is expected to be located with some level of confidence (e.g. 95% confidence).

The external client 180 may be a web server or remote application that may have some association with UEs 105 (e.g. may be accessed by a user of UEs 105) or may be a server, application, or computer system providing a location service to some other user or users which may include obtaining and providing the location of UEs 105 (e.g. to enable a service such as friend or relative finder, asset tracking or child or pet location). Additionally or alternatively, the external client 180 may obtain and provide the location of UEs 105 to an emergency services provider, government agency, etc.

As previously noted, the example positioning system 100 can be implemented using a wireless communication network, such as an LTE-based or 5G NR-based network. 5G NR is a wireless RF interface undergoing standardization by the 3rd Generation Partnership Project (3GPP). 5G NR is poised to offer enhanced functionality over previous generation (LTE) technologies, such as significantly faster and more responsive mobile broadband, enhanced conductivity through Internet of Things (IoT) devices, and more. Additionally, 5G NR enables new positioning techniques for UEs, including Angle of Arrival (AoA)/Angle of Departure (AoD) positioning, UE-based positioning, and multi-cell Round Trip signal propagation Time (RTT) positioning. With regard to RTT positioning, this involves taking RTT measurements between the UE and multiple base stations.

FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105, which may be either a terrestrial UE 105t or aerial UE 105a shown in FIG. 1, by using access nodes 210, 214, 216 (which may correspond with base stations 120 and access points 130 of FIG. 1) and (optionally) an LMF 220 (which may correspond with location server 160) to implement one or more positioning methods. The 5G NR positioning system 200 includes the UE 105, and components 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. Standardization of an NG-RAN and 5G CN is ongoing in 3GPP. Accordingly, NG-RAN 235 and 5G CN 240 may conform to current or future standards for 5G support from 3GPP. The 5G NR positioning system 200 may further utilize information from GNSS satellites 110 from a GNSS system like Global Positioning System (GPS) or similar system. Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only a single UE 105 is illustrated, it will be understood that many UEs (e.g., hundreds, thousands, millions, etc.), which may be terrestrial UEs and/or aerial UEs, may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and Mobility Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, the UE 105 may correspond to a cellphone, smartphone, laptop, tablet, personal data assistant (PDA), tracking device, navigation device, Internet of Things (IoT) device, or some other portable or moveable device terrestrial device or aerial device. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), Long-Term Evolution (LTE), High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225).

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210) and/or an antenna of a gNB. Pairs of gNBs 210 in NG-RAN 235 may be connected to one another (e.g., directly as shown in FIG. 2 or indirectly via other gNBs 210). Access to the 5G network is provided to UE 105 via wireless communication between the UE 105 and one or more of the gNBs 210, which may provide wireless communications access to the 5G CN 240 on behalf of the UE 105 using 5G NR. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214. Base stations 210 communicate with the UE 105, e.g., via a Universal Mobile Telecommunications Service (UMTS) air interface or "Uu interface." Base stations 210, 214 may communicate directly with one another via an Xn communication interface. Additionally or alternatively, base stations 210, 214 may communicate indirectly via another component of the 5G NR positioning system 200, such as the LMF 220.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink and downlink control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250—e.g. if WLAN 216 is a trusted WLAN for 5G CN 240. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information for multiple RATs from the LMF 220, take measurements for one of the multiple RATs (e.g., measurements of the UE 105) and/or obtain measurements from the UE 105 that are transferred to the access node using one or more of the multiple RATs. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a WCDMA protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access.

A core network for EPS may comprise an Evolved Packet Core (EPC). An EPS may then comprise an E-UTRAN plus an EPC, where the E-UTRAN corresponds to NG-RAN 235 and the EPC corresponds to 5G CN 240 in FIG. 2. The methods and techniques described herein for UE 105 positioning using common or generic positioning procedures may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematics (RTK), Precise Point Positioning (PPP), Differential GNSS (DGNSS), ECID, angle of arrival (AoA), angle of departure (AoD), WLAN positioning, and/or other positioning procedures and methods. The LMF 220 may also process location services requests for the UE 105, e.g., received from the AMF 215 or from the GMLC 225. The LMF 220 may be connected to AMF 215 and/or to GMLC 225. The LMF 220 may be referred to by other names such as a Location Manager (LM), Location Function (LF), commercial LMF (CLMF), or value added LMF (VLMF). In some embodiments, a node/system that implements the LMF 220 may additionally or alternatively implement other types of location-support modules, such as an Evolved Serving Mobile Location Center (E-SMLC) or Service Location Protocol (SLP). It is noted that in some embodiments, at least part of the positioning functionality (including determination of a UE's location) may be performed at the UE 105 (e.g., by processing downlink reference signals, such as DL positioning reference signals (DL-PRS) transmitted by wireless nodes such as gNBs 210, ng-eNB 214 and/or WLAN 216, and/or using assistance data provided to the UE 105, e.g., by LMF 220). The UE 105 may additionally transmit uplink reference signals, sometimes referred to as uplink PRS or UL sounding reference signals (SRS) for positioning, which may be received by wireless nodes such as gNBs 210, ng-eNB 214 and/or WLAN 216 and may be referred to as uplink SRS (UL-SRS) or UL-PRS, or which may be received by UEs 105 in sidelink and may be referred to as sidelink SRS (SL-SRS) or SL-PRS. It should be understood that PRS and SRS are examples of reference signals that may be used for positioning, but that other reference signals may be used if desired.

The Gateway Mobile Location Center (GMLC) 225 may support a location request for the UE 105 received from an external client 230 and may forward such a location request to the AMF 215 for forwarding by the AMF 215 to the LMF 220, or may forward the location request directly to the LMF 220. A location response from the LMF 220 (e.g., containing a location estimate for the UE) may be similarly returned to the GMLC 225 either directly or via the AMF 215, and the GMLC 225 may then return the location response (e.g., containing the location estimate) to the external client 230. The GMLC 225 is shown connected to both the AMF 215 and LMF 220 in FIG. 2 though only one of these connections may be supported by 5G CN 240 in some implementations.

As further illustrated in FIG. 2, the LMF 220 may communicate with the gNBs 210 and/or with the ng-eNB 214 using the LPPa protocol (which also may be referred to as NRPPa or NPPa). LPPa protocol in NR may be the same as, similar to, or an extension of the LPPa protocol in LTE (related to LTE Positioning Protocol (LPP)), with LPPa messages being transferred between a gNB 210 and the LMF 220, and/or between an ng-eNB 214 and the LMF 220, via the AMF 215. As further illustrated in FIG. 2, LMF 220 and UE 105 may communicate using the LPP protocol. LMF 220 and UE 105 may also or instead communicate using an LPP protocol (which, in NR, also may be referred to as NRPP or NPP). Here, LPP messages may be transferred between the UE 105 and the LMF 220 via the AMF 215 and a serving gNB 210-1 or serving ng-eNB 214 for UE 105. For example, LPP and/or LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP and/or LPP protocol may be used to support positioning of UE 105 using UE assisted and/or UE based position methods such as A-GNSS, RTK, OTDOA and/or Enhanced Cell ID (ECID). The LPPa protocol may be used to support positioning of UE 105 using network based position methods such as ECID (e.g., when used with measurements obtained by a gNB 210 or ng-eNB 214) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use LPPa and/or LPP to obtain a location of UE 105 in a similar manner to that just described for UE 105 access to a gNB 210 or ng-eNB 214. Thus, LPPa messages may be transferred between a WLAN 216 and the LMF 220, via the AMF 215 and N3IWF 250 to support network-based positioning of UE 105 and/or transfer of other location information from WLAN 216 to LMF 220. Alternatively, LPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using LPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

The LMF 220 may provide positioning assistance data to the UE 105 that may be solicited by the UE 105 or may be unsolicited. For example, unsolicited positioning assistance data may be provided to gNBs 210 by the LMF 220 in Positioning System Information Blocks (posSIBs) that are carried in RRC System Information (SI) and broadcast by the gNBs 210. The positioning assistance data provides information that may be used by the UE 105 to receive and measure DL PRS. The positioning assistance data, for example, may specify a number of frequency layers (sometimes referred to as positioning frequency layers), a number of TRPs (e.g., base stations) per frequency layer, a number of PRS resource sets per TRP, and a number of PRS resources per PRS resource set.

With a UE-assisted position method, UE 105 may obtain location measurements and send the measurements to a location server (e.g., LMF 220) for computation of a location estimate for UE 105. Location measurements may include one or more of a Received Signal Strength Indication (RSSI), RTT, Reference Signal Receive Power (RSRP), Reference Signal Received Quality (RSRQ), Time of Arrival (ToA), AoA, Differential AoA (DAoA), AoD, or Timing Advance (TA) for gNBs 210, ng-eNB 214, and/or one or more access points for WLAN 216. The location measurements may also or instead include measurements of RAT-independent positioning methods such as GNSS (e.g., GNSS pseudorange, GNSS code phase, and/or GNSS carrier phase for GNSS satellites 110), WLAN, etc. With a UE-based position method, UE 105 may obtain location measurements (e.g., which may be the same as or similar to location measurements for a UE assisted position method) and may further compute a location of UE 105 (e.g., with the help of assistance data received from a location server such as LMF 220 or broadcast by gNBs 210, ng-eNB 214, or WLAN 216). With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or ToA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

In a 5G NR positioning system 200, some location measurements taken by the UE 105 (e.g., AoA, AoD, ToA) may use RF reference signals received from base stations 210 and 214. These signals may comprise PRS, which can be used, for example, to execute TDOA, AoD, and RTT-based positioning of the UE 105. Other reference signals that can be used for positioning may include Cell-specific Reference Signal (CRS), Channel State Information Reference Signal (CSI-RS), synchronization signals (e.g., Synchronization Signal Block (SSB) Synchronizations Signal (SS)), etc. Moreover, the signals may be transmitted in a Tx beam (e.g., using beamforming techniques), which may impact angular measurements, such as AoD. Additionally or alternatively, the UE 105 may transmit uplink reference signals, such as UL-SRS, which are received by base stations 210 or 214 used for positioning, such as TDOA, AoA, and RTT. The 5G native positioning technologies supported in 5G NR, for example, include DL-only, UL-only and a combination of DL and UL (DL+UL) positioning methods. For example, DL based positioning technologies include DL Time Difference of Arrival (DL-TDOA) and DL Angle of Departure (DL-AoD). UL based positioning technologies include UL Time Difference of Arrival (UL-TDOA) and UL Angle of Arrival (UL-AoA). A combination of DL and UL (DL+UL) based positioning technologies include round-trip time (RTT) with one or more neighboring base stations (multi-RTT). In addition, Enhanced Cell-ID (E-CID) based on radio resource management (RRM) measurements is supported in 5G NR Rel-16.

As previously discussed, assistance data to assist positioning of UE 105 may be sent to the UE 105 in a solicited or unsolicited fashion. For example, assistance data may be solicited during a positioning session, in which the UE 105 provides its capabilities to a location server, e.g., LMF 220, and the requests assistance data. The location server obtains positioning assistance data for the UE 105, e.g., based on the capabilities of the UE 105 and sends the positioning assistance data, e.g., in an LPP message, to the UE 105 via a base station, such as gNB 210.

In contrast, unsolicited assistance data may be broadcast by one or more base stations, e.g., gNBs 210, and may be received by multiple UEs 105. The broadcast assistance data, accordingly, is not specifically generated for any one UE, but instead provides information that may be useful for positioning by any UE that receives the broadcast assistance data. The broadcast of positioning assistance data is supported via Positioning System Information Blocks (posSIBs) as specified in 3GPP TS 36.331 or 3GPP TS 38.331 and 3GPP TS 37.355. The posSIBs are carried in RRC System Information (SI). A posSIB may be broadcast by the base station, e.g., an eNB for LTE access or gNB for NR access, or a posSIB may be sent by a base station, e.g., gNB for NR access, in response to a UE request for on-demand posSIB.

The positioning assistance data that may be useful for positioning an aerial UE 105a, however, may be different than the positioning assistance data that may be useful for positioning a terrestrial UE 105t. For example, some base stations may be configured to use uptilt beams in which the main lobe of the radiation pattern of the antenna is above the horizontal plane, which would be advantageous for an aerial UE 105a. Other base stations, however, may be configured with only downtilt beams in which the main lobe of the radiation pattern of the antenna is below the horizontal plane, which is suitable for a terrestrial UEs 105t and may only provide weak signals for an aerial UE 105a.

Figure 3:
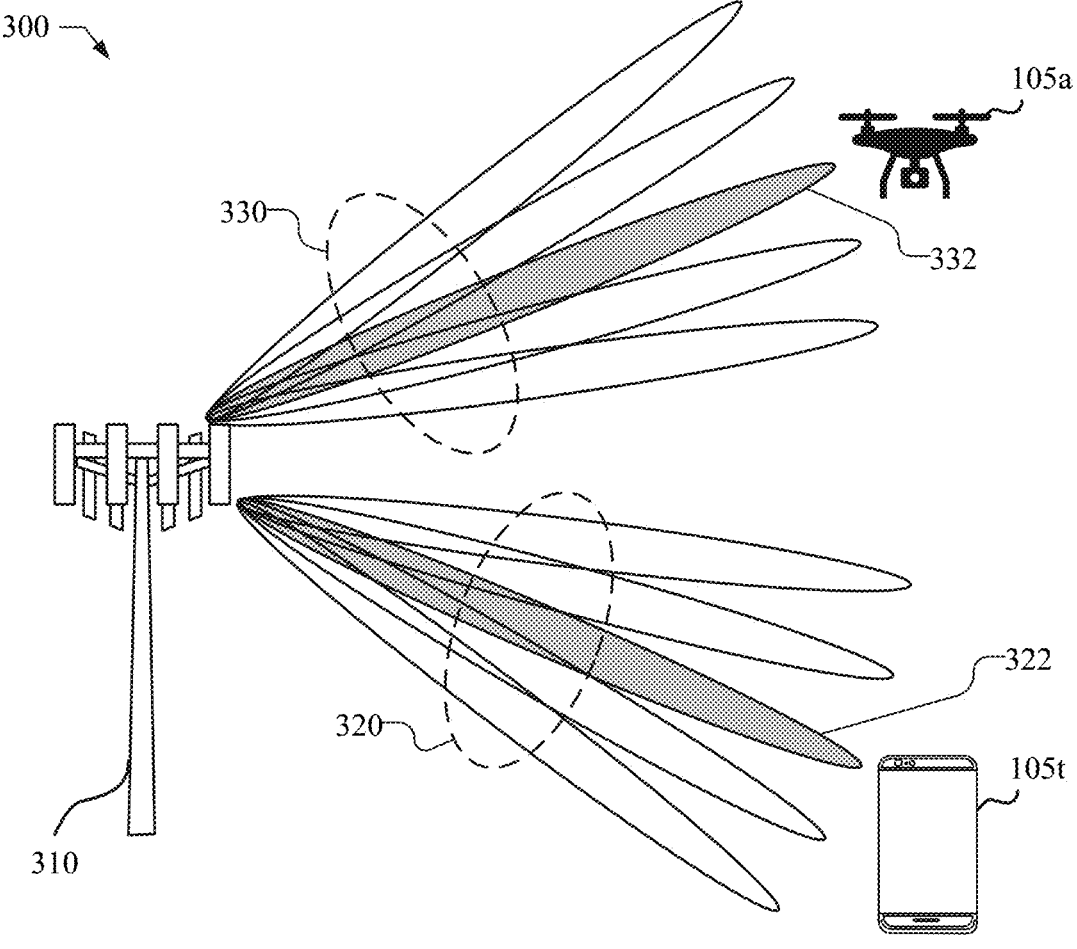
FIG. 3 illustrates an environment that includes an aerial UE and a terrestrial UE and a base station capable of generating uptilted and downtilted beams.

FIG. 3, by way of example, illustrates an environment 300 that includes a base station 310, an aerial UE 105a and a terrestrial UE 105t. As illustrated, the base station 310 is capable of transmitting a plurality of PRS resources (illustrated as beams). The base station 310 is configured to generate a number of the PRS resources (320), including downtilted beams, i.e., beams configured with the main lobe of the radiation pattern below the horizontal plane. A terrestrial UE 105t, which is typically on the ground or near the ground (e.g., in a building), is generally below the horizontal plane and thus is positioned to receive the downtilted beams 320, as illustrated by the shaded beam 322.

The base station 310 may be further configured to generate a number of the PRS resources (330) that are uptilted, i.e., configured with the main lobe of the radiation pattern above the horizontal plane. An aerial UE 105a, which is some vertical distance above the ground, may be above the horizontal plane and thus positioned to receive the uptilted beams 330, as illustrated by the shaded beam 332.

Thus, the aerial UE 105a may use the uptilted beams 330 for positioning. However, not all base stations are configured to generate uptilted beams. Moreover, the aerial UE 105a, while it is above the horizontal plane may not be positioned to receive the downtilted beams 320 with sufficient strength for positioning. Accordingly, the PRS resources or PRS resource sets that are relevant for positioning for the aerial UE 105a may be different than the PRS resources or PRS resource sets that are relevant for positioning for the terrestrial UE 105t.

Further, an aerial UE 105a may have a significantly more base stations that are line of sight (LOS) than a terrestrial UE 105t because the aerial UE 105a is in the air above common obstructions, such as buildings and trees, etc.

Figure 4B:
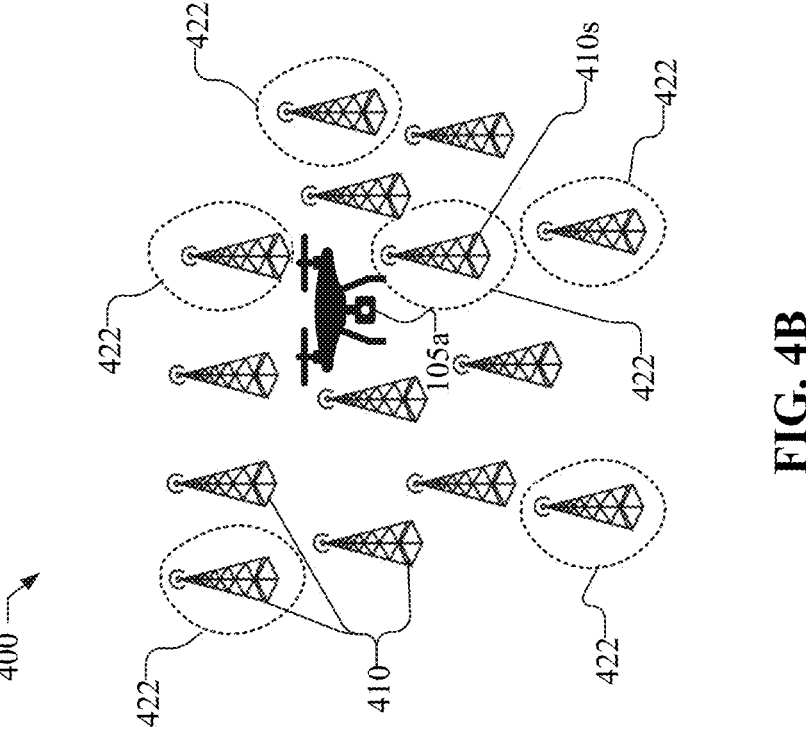
FIGS. 4A and 4B illustrate top plan views of an environment that includes a plurality of base stations and, respectively, the terrestrial UE and the aerial UE.
Figure 4A:
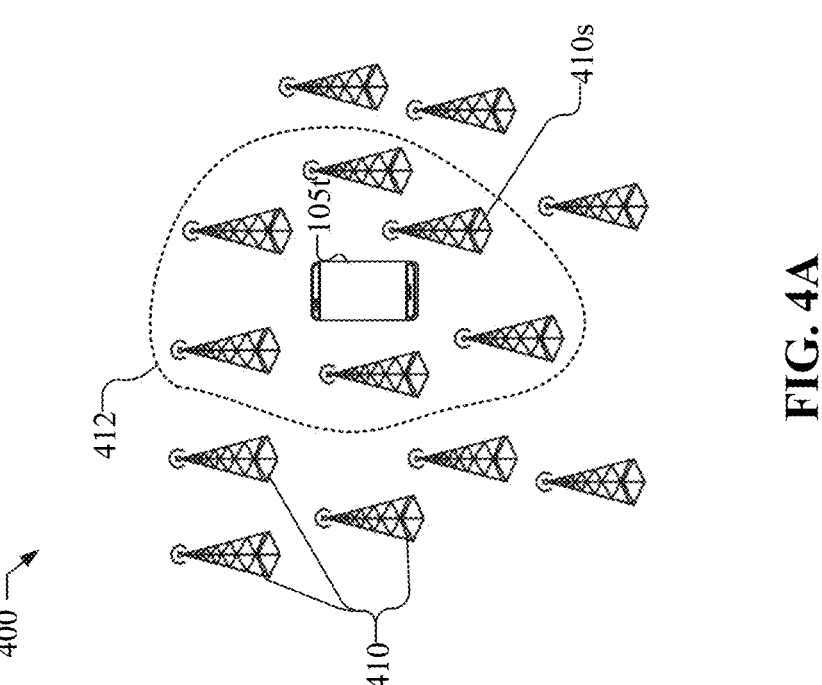

FIGS. 4A and 4B, for example, illustrate top plan views of an environment 400 that includes a plurality of base stations 410 and, respectively, the terrestrial UE 105t and the aerial UE 105a. Base station 410s may be the serving base station for the terrestrial UE 105t in FIG. 4A and for the aerial UE 105a in FIG. 4B. The dotted line 412 in FIG. 4A illustrates the base stations 410 that may be most relevant for positioning for the terrestrial UE 105t, e.g., including the serving base station and neighboring base stations that may be used TDOA measurements. Because the terrestrial UE 105t is on or near the ground, there may be a significant number of obstructions, which may interfere with reception of PRS resources from more distance base stations 410, and accordingly, the most relevant base stations for positioning the terrestrial UE 105t may be relatively close to the terrestrial UE 105a.

In FIG. 4B, the aerial UE 105a is at the same location (i.e., the same latitude and longitude) as the terrestrial UE 105t shown in FIG. 4A, but is at a different vertical position (vertically higher) than the terrestrial UE 105t. Accordingly, the aerial UE 105a may have LOS to a significantly greater number of base stations 410. The relevant base stations for positioning the aerial UE 105a, e.g., including the serving base station and neighboring base stations that may be used TDOA measurements illustrated with dotted lines 422, may be more distant than the relevant base stations for the terrestrial UE 105t. As discussed above, however, not all base stations may produce uptilted beams, and thus, not all distant base stations may be suitable for positioning the aerial UE 105a.

Figure 5:
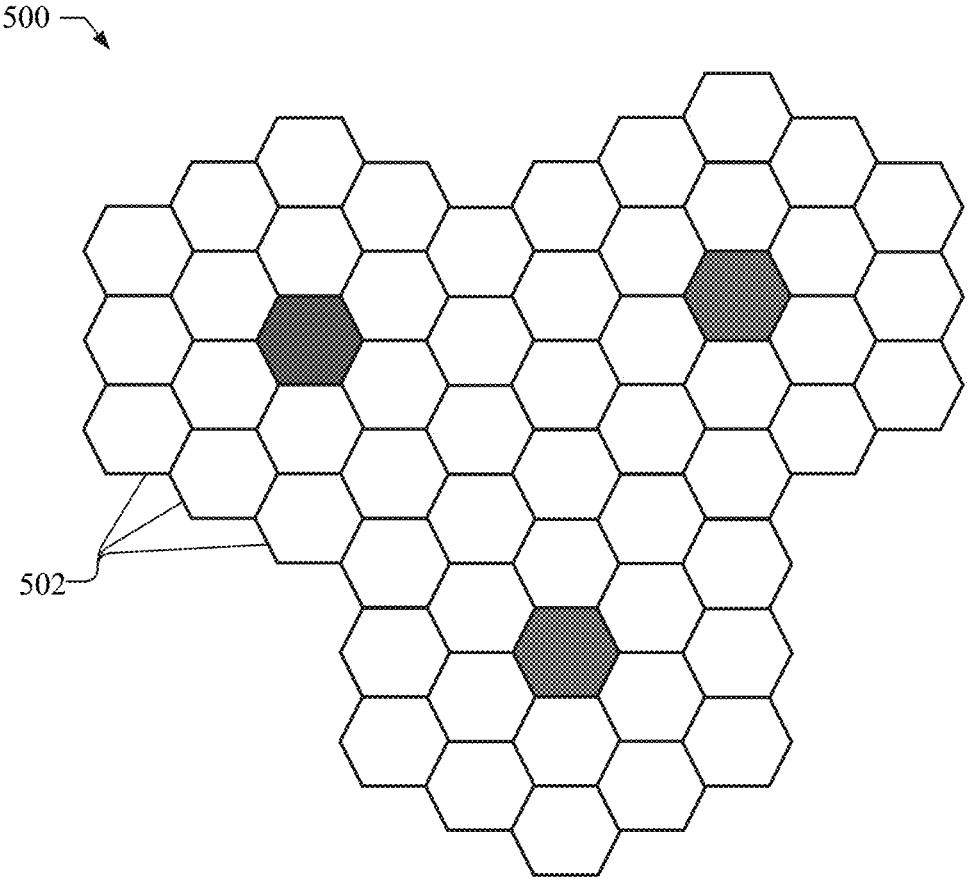
FIG. 5 illustrates an environment with a number of cells that may be used for positioning one or both of the terrestrial UE and the aerial UE.

FIG. 5 illustrates an environment 500 with a number of cells 502, each including a base station, that may be used for positioning one or both of the terrestrial UE 105t and the aerial UE 105a. The cells that may produce uptilted beams are shown with grey shading in FIG. 5. A subset of the cells (base stations), shown with grey shading in FIG. 5, may be configured to produce downtilted and uptilted beams and are suitable for both terrestrial UE 105t and aerial UEs 105a, and the remaining cells (shown with white fill) may produce only downtilted beams and are thus suitable for only terrestrial UEs 105t, or aerial UEs 105a that are near the surface, i.e., below a threshold vertical height. Moreover, due to increased line of sight for aerial UEs 105a, more neighboring cells (base stations) may be available for positioning an aerial UE 105a than a terrestrial UE 105t at the same latitude and longitude.

Accordingly, positioning assistance data relevant for aerial UEs 105a may be different than the positioning assistance data relevant for terrestrial UEs 105t. For example, the base stations participating in positioning of the aerial UEs 105a may be different than the base stations participating in positioning of the terrestrial UEs 105a. Moreover, the PRS resource sets that may be used for positioning the aerial UEs 105a may be different than the PRS resource sets that may be used for positioning the terrestrial UEs 105a. Additionally, the PRS resources that may be used for positioning the aerial UEs 105a may be different than the PRS resources that may be used for positioning the terrestrial UEs 105a. Currently, however, broadcast positioning assistance data, e.g., in posSIBs, does not distinguish terrestrial UEs or aerial UEs. Current posSIBs (which may sometimes be referred to herein as legacy posSIBs) thus is suitable for terrestrial UEs 105a (which may sometimes be referred to herein as legacy UEs) and may not be suitable for aerial UEs.

As described herein, aerial UE specific positioning assistance data may be broadcast by base stations (TRPs) so that aerial UEs have access to broadcast assistance data that is suitable for aerial UEs and do not have to rely on positioning assistance data that is for terrestrial UEs.

Thus, as described herein, positioning assistance data that is broadcast by one or more TRPs may PRS related information specific for aerial UEs along with the PRS related information for terrestrial UEs. For example, in one implementation, broadcast positioning assistance data may be appended to include PRS information specific for aerial UEs along with the PRS information for terrestrial UEs, e.g., in the same posSIBs.

For example, in one implementation, the set of TRPs, as well as the DL PRS resource sets and DL PRS resources per TRP, that may participate in positioning aerial UEs may be completely separate from the set of TRPs, DL PRS resource sets, and DL PRS resources per TRP for positioning terrestrial UEs. Thus, the positioning assistance data for broadcasting provided by location server, e.g., LMF 222, may indicate different lists of PRS assistance data for aerial UEs and terrestrial UEs.

By way of example, applying the use of different lists of PRS assistance data to OTDOA-UE-Assisted (posSIBtype3-1) is illustrated in Table 1 below. The following tables are based on a fragment of Abstract Syntax Notation One (ASN.1). The subscripts "-rxx" in the following tables may not be considered part of a parameter name and may be included only to indicate a 3GPP release in which the parameter is first defined. The information element (IE) otdoa-NeighbourCellInfo-Aerial-rXX illustrated in Table 1, for example, may be aerial UE specific information that is provided separately from the terrestrial UE information (otdoa-NeighbourCellInfo-r15), but may be similarly formatted as the terrestrial UE information (otdoa-NeighbourCellInfo-r15).

TABLE 1

```
OTDOA-UE-Assisted-r15 ::= SEQUENCE {
    otdoa-ReferenceCellInfo-r15 OTDOA-ReferenceCellInfo,
    otdoa-NeighbourCellInfo-r15 OTDOA-NeighbourCellInfoList,
    ...,
    otdoa-NeighbourCellInfo-Aerial-rXX OTDOA-NeighbourCellInfoList
        OPTIONAL --Need ON
}
```

In another example, the use of different lists of PRS assistance data per frequency layer may be applied to NR-DL-PRS-AssistanceData (posSIBtype6-1) is illustrated in Table 2 below. The IE nr-DL-PRS-AssistanceDataPerFreq-Aerial-rXX, for example, may be aerial UE specific information that is provided separately from the terrestrial UE information (nr-DL-PRS-AssistanceDataPerFreq-r16), but may be similarly formatted as the terrestrial UE information (nr-DL-PRS-AssistanceDataPerFreq-r16). The maximum number of TRPs per frequency layer for aerial UEs (nrMaxTRPsPerFreq-Aerial-rXX) may be different than for terrestrial UEs (nrMaxTRPsPerFreq-r16).

TABLE 2

```
NR-DL-PRS-AssistanceDataPerFreq-r16 ::= SEQUENCE {
    nr-DL-PRS-PositioningFrequencyLayer-r16
        NR-DL-PRS-PositioningFrequencyLayer-r16,
    nr-DL-PRS-AssistanceDataPerFreq-r16 SEQUENCE (SIZE
        (1..nrMaxTRPsPerFreq-r16)) OF
        NR-DL-PRS-AssistanceDataPerTRP-r16,
    ...,
    nr-DL-PRS-AssistanceDataPerFreq-Aerial-rXX SEQUENCE (SIZE
        (1..nrMaxTRPsPerFreq-Aerial-rXX)) OF
        NR-DL-PRS-AssistanceDataPerTRP-r16 OPTIONAL --Need ON
}
```

In another example, the use of different lists of PRS assistance data per frequency layer may be applied to NR-UEB-TRP-LocationData (posSIBtype6-2) is illustrated in Table 3 below. For UE-based DL positioning, the TRP-locations may be broadcast to UEs using the IE NR-TRP-LocationInfo-r16. The IE NR-TRP-LocationInfo is used by the location server to provide the coordinates of the antenna reference points for a set of TRPs. For each TRP, the TRP location can be provided for each associated PRS Resource ID per PRS Resource Set. The IE trp-LocationInfoList-Aerial-rXX, for example, may be aerial UE specific information that is provided separately from the terrestrial UE information (trp-LocationInfoList-r16), but may be similarly formatted as the terrestrial UE information (trp-LocationInfoList-r16). Further, the TRP-LocationInfoElement-r16 may be different for aerial UE than TRP-LocationInfoElement-r16 for terrestrial UEs.

TABLE 3

```
NR-UEB-TRP-LocationData-r16 ::= SEQUENCE {
    nr-trp-LocationInfo-r16 NR-TRP-LocationInfo-r16,
    nr-dl-prs-BeamInfo-r16 NR-DL-PRS-BeamInfo-r16 OPTIONAL, -- Need
        ON
    ...
```

TABLE 3-continued

```
}
NR-TRP-LocationInfo-r16 ::= SEQUENCE (SIZE (1..nrMaxFreqLayers-r16)) OF
NR-TRP-LocationInfoPerFreqLayer-r16
NR-TRP-LocationInfoPerFreqLayer-r16 ::= SEQUENCE {
referencePoint-r16 ReferencePoint-r16 OPTIONAL, -- Cond NotSameAsPrev
trp-LocationInfoList-r16 SEQUENCE (SIZE (1..nrMaxTRPsPerFreq-r16)) OF
TRP-LocationInfoElement-r16

...,
trp-LocationInfoList-Aerial-rXX SEQUENCE (SIZE (1..nrMaxTRPsPerFreq-
Aerial-rXX)) OF TRP-LocationInfoElement-r16 OPTIONAL --Need ON
}
```

In another example, the use of different lists of PRS assistance data per frequency layer may be applied to NR-UEB-TRP-RTD-Info (posSIBtype6-3) is illustrated in Table 4 below. The IE rtd-InfoList-Aerial-rXX, for example, may be aerial UE specific information that is provided separately from the terrestrial UE information (rtd-InfoList-r16), but may be similarly formatted as the terrestrial UE information (rtd-InfoList-r16). The IE NR-RTD-Info is used by the location server to provide time synchronization information between a reference TRP and a list of neighbor TRPs, and because different neighbor TRPs may be used for aerial UEs than terrestrial UEs, different RTD information (rtd-InfoList-Aerial-rXX) may be provided for positioning aerial UEs.

TABLE 4

```
NR-UEB-TRP-RTD-Info-r16 ::= SEQUENCE {
    nr-rtd-Info-r16 NR-RTD-Info-r16,
    ...
}
NR-RTD-Info-r16 ::= SEQUENCE {
    referenceTRP-RTD-Info-r16 ReferenceTRP-RTD-Info-r16,
    rtd-InfoList-r16 RTD-InfoList-r16,
    ...,
    rtd-InfoList-Aerial-rXX RTD-InfoList-r16 OPTIONAL --Need ON
}
RTD-InfoList-r16 ::= SEQUENCE (SIZE (1..nrMaxFreqLayers-r16)) OF
    RTD-InfoListPerFreqLayer-r16
RTD-InfoListPerFreqLayer-r16 ::= SEQUENCE
    (SIZE(1..nrMaxTRPsPerFreq-r16)) OF RTD-InfoElement-r16
RTD-InfoElement-r16 ::= SEQUENCE {
    dl-PRS-ID-r16 INTEGER (0..255),
    nr-PhysCellID-r16 NR-PhysCellID-r16 OPTIONAL, -- Need ON
    nr-CellGlobalID-r16 NCGI-r15 OPTIONAL, -- Need ON
    nr-ARFCN-r16 ARFCN-ValueNR-r15 OPTIONAL, -- Need ON
    subframeOffset-r16 INTEGER (0..1966079),
    rtd-Quality-r16 NR-TimingQuality-r16,
    ...
}
```

In one implementation, some TRPs that may participate in positioning may be the same for aerial UEs 105a and terrestrial UEs lost. The PRS resources for the TRPs that may be used for positioning aerial UEs 105a, however, may be different than the PRS resources that may be used for positioning terrestrial UEs 105t. Accordingly, the positioning assistance data for broadcasting provided by the location server, e.g., LMIF 220, may indicate a different aerial UE specific PRS configurations per TRP, e.g., including PRS resource sets and PRS resources.

For example, the use of different aerial UE specific PRS configurations per TRP may be applied to NR-DL-PRS-AssistanceData (posSIBtype6-1) is illustrated in Table 5 below. The IE nr-DL-PRS-ResourceSetList-Aerial-rXX, for example, may be aerial UE specific list of DL-PRS resource sets per TRP that is provided separately from the terrestrial UE information (nr-DL-PRS-ResourceSetList-r16), but may be similarly formatted as the terrestrial UE information (nr-DL-PRS-ResourceSetList-r16).

TABLE 5

```
NR-DL-PRS-Info-r16 ::= SEQUENCE {
    nr-DL-PRS-ResourceSetList-r16 SEQUENCE (SIZE
        (1..nrMaxSetsPerTrp-r16)) OF NR-DL-PRS-ResourceSet-r16,
    ...,
    nr-DL-PRS-ResourceSetList-Aerial-rXX SEQUENCE (SIZE
        (1..nrMaxSetsPerTrp-Aerial-rXX)) OF
        NR-DL-PRS-ResourceSet-r16 OPTIONAL --Need ON
}
```

In one implementation, the set of TRPs that may participate in positioning aerial UEs and terrestrial UEs may overlap. Accordingly, the positioning assistance data for broadcasting provided by the location server, e.g., LMF 220, may indicate a list of TRPs for positioning only aerial UEs and may indicate the TRPs from the list of TRPs for positioning terrestrial UEs that may also be used for positioning aerial UEs. In one example, list of TRPs for positioning only aerial UEs may include TRPs from the list of TRPs for positioning terrestrial and aerial UEs, and the order of the list of TRPs for positioning. The order of the TRPs in the list for only aerial UEs may be the preferred ordering (priority) of TRPs for measurement by aerial UEs and the order of the TRPs in the list for aerial UEs and terrestrial UEs may be the preferred ordering (priority) of TRPs for measurement by terrestrial UEs.

In one implementation, an aerial UE may measure the DL PRSs from a subset of the aerial only TRP list and/or the terrestrial and aerial TRP list. The location server, e.g., LMF 220, may indicate the priority, e.g., the preferred order, for the TRPs from one or both lists. The aerial UEs and terrestrial UEs may be configured with a different ordering of TRPs. The preferred ordering of TRPs for measurement by aerial UEs, for example, may be indicated with the ordering of the elements of the union of the two lists.

For example, the use of an additional list of PRS assistance data associated with TRPs for aerial UE and the ordering of TRPs for aerial UEs applied to NR-DL-PRS-AssistanceData (posSIBtype6-1) is illustrated in Table 6 below. The IE nr-DL-PRS-AssistanceDataPerFreq-Additional-Aerial-rXX, for example, may be aerial UE specific list of PRS assistance data associated with TRPs that is provided separately from the terrestrial UE information (nr-DL-PRS-AssistanceDataPerFreq-r16), but may be similarly formatted as the terrestrial UE information (nr-DL-PRS-AssistanceDataPerFreq-r16). Additionally, the IE NR-DL-PRS-ID-ordering-Aerial SEQUENCE, for example, may be aerial UE specific ordering of the PRS assistance data associated with TRPs, which may identify PRS IDs (e.g., DL-PRS-ResourceSets per dl-PRS-ID of frequency layer) from one or both of the aerial UE specific list of PRS assistance data associated with TRPs (nr-DL-PRS-Assis-tanceDataPerFreq-Additional-Aerial-rXX) and the terres-trial UE list (nr-DL-PRS-AssistanceDataPerFreq-r16).

TABLE 6

```
NR-DL-PRS-AssistanceDataPerFreq-r16 ::= SEQUENCE {
    nr-DL-PRS-PositioningFrequencyLayer-r16
        NR-DL-PRS-PositioningFrequencyLayer-r16,
    nr-DL-PRS-AssistanceDataPerFreq-r16 SEQUENCE (SIZE
        (1..nrMaxTRPsPerFreq-r16)) OF
        NR-DL-PRS-AssistanceDataPerTRP-r16,
    ...,
    nr-DL-PRS-AssistanceDataPerFreq-Additional-Aerial-rXX SEQUENCE
        (SIZE (1..nrMaxTRPsPerFreq-Aerial-rXX)) OF
        NR-DL-PRS-AssistanceDataPerTRP-r16, OPTIONAL --Need ON
    NR-DL-PRS-ID-ordering-Aerial SEQUENCE (SIZE
        (1..nrMaxTRPsPerFreq-Aerial-rXX)) OF dl-PRS-ID-r16
}
```

In one implementation, for each TRP, the DL PRS resource sets for aerial UEs and terrestrial UEs may be same. But UEs may only measure a subset of DL-PRS resource sets. Accordingly, the priority of the DL-PRS resource sets may be provided, which may differ for aerial UEs and terrestrial UEs. Accordingly, the positioning assistance data for broadcasting provided by the location server, e.g., LMF 220, may indicate the priority of DL-PRS resource sets for a TRP for aerial UEs, and may separately indicate the priority of DL-PRS resource sets for a TRP for terrestrial UEs.

For example, the ordering of the priority of DL-PRS resource sets for a TRP for aerial UEs applied to NR-DL-PRS-AssistanceData (posSIBtype6-1) is illustrated in Table 7 below. The IE nr-DL-PRS-ResourceSetListOrder-Aerial-rXX, for example, may be aerial UE specific ordering of the PRS resource set IDs per TRP.

TABLE 7

```
NR-DL-PRS-Info-r16 ::= SEQUENCE {
    nr-DL-PRS-ResourceSetList-r16 SEQUENCE (SIZE
        (1..nrMaxSetsPerTrp-r16)) OF NR-DL-PRS-ResourceSet-r16,
    ...,
    nr-DL-PRS-ResourceSetListOrder-Aerial-rXX SEQUENCE (SIZE
        (1..nrMaxSetsPerTrp-Aerial-rXX)) OF
        NR-DL-PRS-ResourceSetID-r16 OPTIONAL --Need ON
}
```

In another implementation, positioning assistance data may include new posSIBs for PRS information that is specific for aerial UEs and that that are separate from the posSIBs for PRS information specific for terrestrial UEs. For example, posSIBs specific for aerial UEs may be defined separately from but in the same manner as posSIBs for terrestrial UEs, for example. The aerial UE specific posSIBs, for example, may carry OTDOA-UE-Assisted, NR-DL-PRS-AssistanceData, NR-UEB-TRP-LocationData, and NR-UEB-TRP-RTD-information, as illustrated in Tables 1-7 above. The format for the aerial specific posSIBs may be the same as the terrestrial (i.e., legacy) posSIBs, but the contents may be different for the aerial UEs.

The UEs may receive broadcast positioning assistance data as discussed above and would determine whether to use aerial specific information or terrestrial specific information. For example, in one implementation, where the aerial UE information and terrestrial UE information is provided in different posSIBs, the aerial UE information may be encrypted and an aerial UE 105a may receive and decrypt the posSIBs with the aerial UE information if the aerial UE

105a has an aerial subscription. Where aerial UE informa-tion and terrestrial UE information is provided in the same posSIB, the terrestrial UEs 105t, i.e., any UE without an aerial subscription, may ignore the aerial UE information. Additionally or alternatively, aerial UEs 105a may be con-figured to use the aerial UE information when the aerial UE is flying above a predetermined height. For example, if the aerial UE 105a is on the ground or near the ground, the aerial UE 105a may use the terrestrial (legacy) positioning assis-tance information. The aerial UE 105a, for example, may determine that its vertical coordinate is larger than a prede-termined threshold where the threshold may be signaled to the aerial UE 105a, in order to use the aerial positioning assistance data. If a TRB does not broadcast aerial UE specific positioning assistance data, the aerial UE 105a may use the terrestrial fall back to the general (non-aerial) info list.

Figure 6:
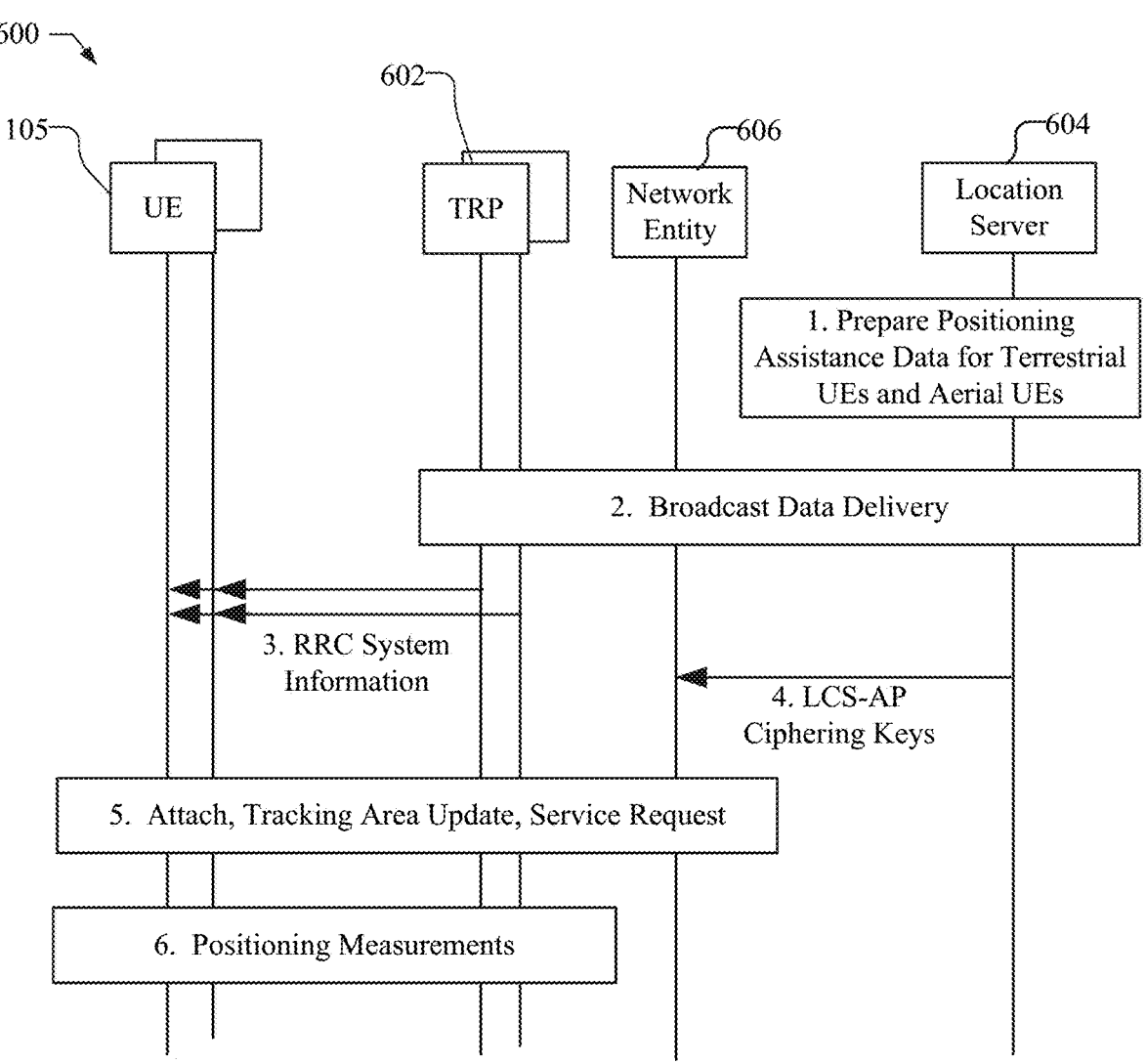
FIG. 6 shows an example signaling flow for broadcasting positioning assistance data that includes information for positioning aerial UEs and information for positioning terrestrial UEs before or during a location session.

FIG. 6 shows an example signaling flow 600 for broad-casting positioning assistance data that includes information for positioning aerial UEs and information for positioning terrestrial (or legacy) UEs before or during a location session. The signaling flow 600, for example, may be performed in a communication system, such as illustrated in FIG. 1 or FIG. 2, that includes one or more UEs including an aerial UE 105a and a terrestrial UE 105t, one or more TRPs 602, which may be base stations 120 shown in FIG. 1 or gNBs 210 shown in FIG. 2, a location server 604, which may be location server 160 shown in FIG. 1 or LMF 220 shown in FIG. 2, and an intervening network entity 606, which may be, e.g., and entity in network 170 or the AMF 215 shown in FIG. 2. Location server 604 may be located remotely in the core network, e.g., core network 240 shown in FIG. 2 or may be coincident with a TRP 620. The UEs 105 may be configured to perform UE assisted positioning or UE based positioning, in which the UE itself determines its location using, for example, assistance data provided to it.

At stage 1 in signaling flow 600, the various assistance data elements for each supported positioning method are collected, processed and formatted at the location server 604. For example, the location server 604 may gather PRS configuration data (e.g. for OTDOA, TDOA, RTT, RTK, ECID, AoA, AoD, or any desired positioning methods) from TRPs 602 and/or other sources (e.g. Operations and Main-tenance). The location server 604 may identify information that is specific for positioning aerial UEs and information that may be used for positioning terrestrial (i.e., legacy) UEs. The location server 604 may additionally include in the positioning assistance data a vertical height threshold for determining when to use aerial UE specific information. The location server 604 may partition the positioning assistance data and encode and potentially cipher positioning System Information Block (posSIB) content. For example, the loca-tion server 604 may encode PRS related information that is specific for aerial UEs along with the PRS related informa-tion for terrestrial UEs in posSIBs. For example, in one implementation, PRS related information that is specific for aerial UEs may be appended along with the PRS related information for terrestrial UEs in the same posSIBs, e.g., as discussed above in reference to Tables 1-7.

For example, as discussed above, the positioning assis-tance data may include a list of positioning assistance data per frequency layer for aerial UEs that is different than a list of positioning assistance data per frequency layer for ter-restrial UEs. The information for aerial UEs, for example, may include a first set of TRPs that are configured for positioning aerial UEs and DL reference signal (e.g., PRS) configurations per TRP in the first set of TRPs. The first set of TRPs and DL PRS configurations per TRP may be listed separately from a second set of TRPs and DL PRS configurations per TRP that are configured for positioning terrestrial UEs, e.g., as illustrated in reference to Tables 1-4.

In another example, the information for aerial UEs may include a first set of DL PRS configurations per TRP that are configured for positioning aerial UEs, where the first set of DL PRS per TRP may be listed separately from a second set of DL PRS configurations per TRP that are configured for positioning terrestrial UEs, e.g., as illustrated in reference to Table 5.

In another example, the positioning assistance data may include a first set of TRPs that are configured for positioning both aerial UEs and terrestrial UEs, the information for aerial UEs may include identifiers for the TRPs that are configured for positioning aerial UEs from the first set of TRPs and may include an indication of a priority of the TRPs that are configured for positioning aerial UEs, e.g., as illustrated in reference to Table 6 above. the positioning assistance data comprises a first set of TRPs that are configured for positioning both aerial UEs and terrestrial UEs and an indication of a priority of the TRPs that are configured for positioning aerial UEs. The information for aerial UEs may further include an indication of a priority of the TRPs that are configured for positioning aerial UEs, e.g., as illustrated in reference to Table 6 above. In one example, the positioning assistance data may further include a second set of TRPs that are configured for positioning only aerial UEs, e.g., as illustrated in reference to Table 6 above. The information for aerial UEs may further include an indication of a priority of TRPs that are configured for positioning aerial UEs in the first set of TRPs and the TRPs in the second set of TRPs, e.g., as illustrated in reference to Table 6 above.

In another example, the positioning assistance data may include DL PRS configurations per TRPs, and the information for the aerial UEs may include identifiers for DL PRS configurations that are configured for positioning aerial UEs, e.g., as illustrated in reference to Table 7 above. The information for aerial UEs may further include an indication of a priority of the DL PRS configurations that are configured for positioning aerial UEs, e.g., as illustrated in reference to Table 7 above.

In another implementation, the location server 604 may encode the PRS related information that is specific for aerial UEs and the PRS related information for terrestrial UEs in separate posSIBs.

The location server 604, for example, may cipher the posSIBs using the 128-bit Advanced Encryption Standard (AES) algorithm defined by the National Institute of Standards and Technology (NIST) in the United States. For example, AES counter mode may be used.

At stage 2, the assistance data information is provided to the TRPs 602 (e.g. via intermediate network entity 606) and to other TRPs using LPPa procedures for LTE or NRPPa for NR. The TRPs 602 thus, obtains the positioning assistance data that includes PRS related information that is specific for aerial UEs along with the PRS related information for terrestrial UEs, as discussed in stage 1.

At stage 3, the TRPs 602 broadcasts the received assistance data information in System Information (SI) Messages which may be for a Radio Resource Control (RRC) protocol. The UEs 105 may apply a system information acquisition procedure to acquire the assistance data information, including PRS related information that is specific for aerial UEs along with the PRS related information for terrestrial UEs that are broadcasted in the positioning SI messages. In some implementations, the positioning assistance data received by the UEs 105 includes a vertical height threshold for determining when to use aerial UE specific information. If the UE 105 is an aerial UE, and the UE 105 may decode only the posSIBs that include the information for the aerial UEs, and if the UE 105 is a terrestrial UE, the UE may decode only the posSIBs that include the information for the terrestrial UEs. If the UE 105 is an aerial UE, the UE may access the information for the aerial UEs based on a subscription, e.g., as described further in stages 4 and 5. If the UE 105 is an aerial UE, the UE may determine its vertical coordinate, i.e., vertical height and determine if the vertical coordinate is greater than a threshold. The information for the aerial UEs may be accessed by the UE 105 if the vertical coordinate for the aerial UE is greater than the threshold and the information for the terrestrial UEs is accessed if the vertical coordinate for the aerial UE is less than the threshold.

At stage 4, the location server 604 may provide any ciphering keys being used at stage 1 to the intervening network entity 606 and other network entities. For example, the ciphering keys may be provided at stage 4 using a Location Services Application Protocol (LCS-AP) message. Information that is provided for each key at stage 4 may include an identification of applicable posSIBs, a key value, a key identifier and a time and geographic area of key applicability.

At stage 5, the network entity 606 may distribute the ciphering keys to suitably subscribed UEs (e.g. UE 102) using a NAS mobility management procedure such as an Attach or Tracking Area Update. Alternatively, a Supplementary Services procedures could be used to distribute the keys (e.g., a Mobile Originated Located Request (MO-LR)). The keys may be used by a UE (e.g. UE 105) to decipher the assistance data that is specific for aerial UEs received in a positioning SI message broadcast at stage 3 when ciphering is used, e.g., if the UE 105 subscribes for has an aerial subscription.

At stage 6, one or more UEs 105 may perform positioning measurements of DL PRS transmitted by the TRPs 602 based at least in part on the broadcasted positioning assistance data received by the UE in stage 3. The positioning measurements may be performed in a positioning session with location server 604, which may be initiated before or after receiving the broadcasted positioning assistance data in stage 3.

Figure 7:
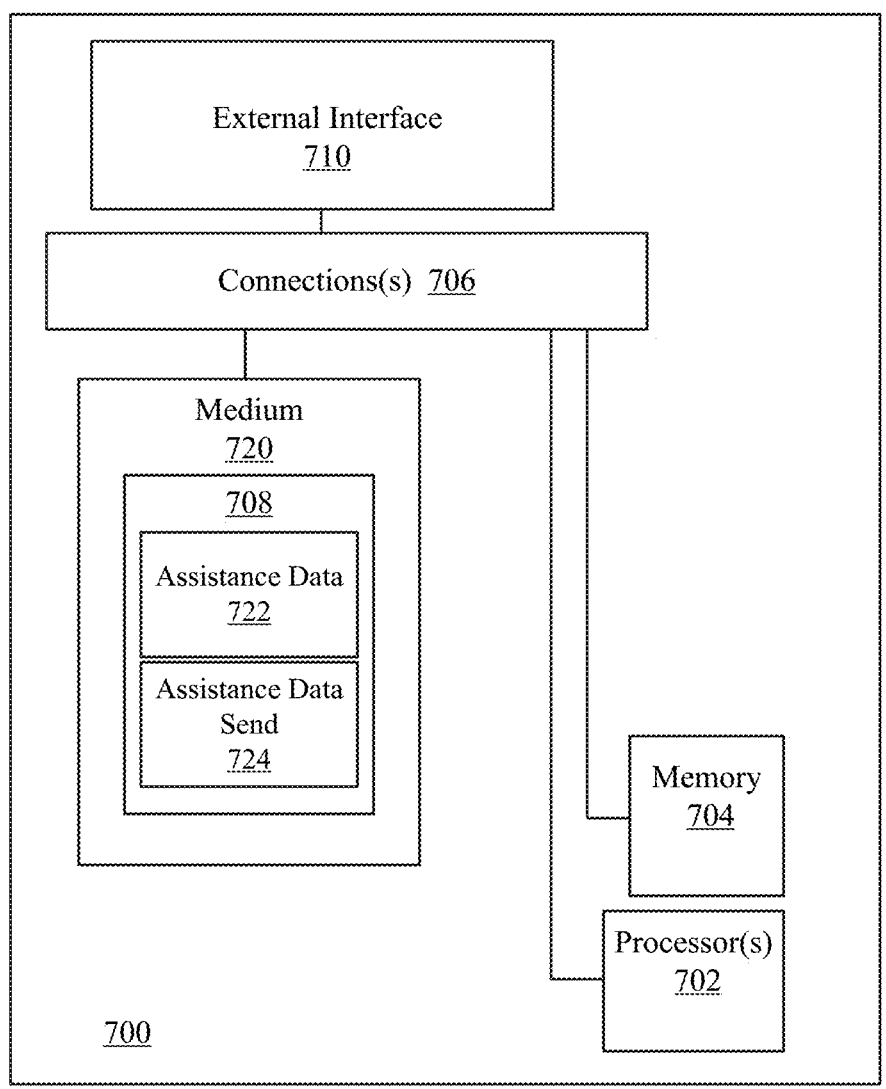
FIG. 7 shows a schematic block diagram illustrating certain exemplary features of a location server enabled to support positioning of the UE.

FIG. 7 shows a schematic block diagram illustrating certain exemplary features of a location server 700, e.g., such as location server 160, LMF 220 or location server 604, enabled to support positioning of the UE using broadcast positioning assistance data that includes information for aerial UEs and information for terrestrial UEs. Location server 700 may be configured to perform the signaling flow 600 shown in FIG. 6 and the process 1000 illustrated in FIG. 10. Location server 700 may, for example, include one or more processors 702, memory 704, an external interface 710, which may be a wireline or wireless network interface to TRPs via other core network entities, such as an AMF 215, which may be operatively coupled with one or more connections 706 (e.g., buses, lines, fibers, links, etc.) to non-transitory computer readable medium 720 and memory 704. The location server 700 may further include additional items, which are not shown, such as a user interface that may include e.g., a display, a keypad or other input device, such as virtual keypad on the display, through which a user may interface. In certain example implementations, all or part of location server 700 may take the form of a chipset, and/or the like.

The one or more processors 702 may be implemented using a combination of hardware, firmware, and software. For example, the one or more processors 702 may be configured to perform the functions discussed herein by implementing one or more instructions or program code 708 on a non-transitory computer readable medium, such as medium 720 and/or memory 704. In some embodiments, the one or more processors 702 may represent one or more circuits configurable to perform at least a portion of a data signal computing procedure or process related to the operation of location server 700.

The medium 720 and/or memory 704 may store instructions or program code 708 that contain executable code or software instructions that when executed by the one or more processors 702 cause the one or more processors 702 to operate as a special purpose computer programmed to perform the techniques disclosed herein. As illustrated in location server 700, the medium 720 and/or memory 704 may include one or more components or modules that may be implemented by the one or more processors 702 to perform the methodologies described herein. While the components or modules are illustrated as software in medium 720 that is executable by the one or more processors 702, it should be understood that the components or modules may be stored in memory 704 or may be dedicated hardware either in the one or more processors 702 or off the processors.

A number of software modules and data tables may reside in the medium 720 and/or memory 704 and be utilized by the one or more processors 702 in order to manage both communications and the functionality described herein. It should be appreciated that the organization of the contents of the medium 720 and/or memory 704 as shown in location server 700 is merely exemplary, and as such the functionality of the modules and/or data structures may be combined, separated, and/or be structured in different ways depending upon the implementation of the location server 700.

The medium 720 and/or memory 704 may include an assistance data module 722 that when implemented by the one or more processors 702 configures the one or more processors 702 to obtain, via external interface 710, positioning assistance data, e.g., from one or more TRPs, to be broadcast by the one or more TRPS, wherein the positioning assistance data includes information for aerial UEs and information for terrestrial UEs, e.g., as discussed in stage 1 in FIG. 6 and illustrated in reference to TABLEs 1-7. The one or more processors 702, for example, may be configured to identify information that is specific for positioning aerial UEs and information that may be used for positioning terrestrial (i.e., legacy) UEs and may partition the positioning assistance data, and encode and, if desired, cipher, one or more posSIBs with the positioning assistance data. The one or more processors 702 may encode PRS related information that is specific for aerial UEs along with the PRS related information for terrestrial UEs in the same or separate posSIBs. The one or more processors 702 may be further configured to include a vertical height threshold in the positioning assistance data for determining if information that is specific for positioning aerial UEs is to be used.

The medium 720 and/or memory 704 may include an assistance data send module 724 that when implemented by the one or more processors 702 configures the one or more processors 702 to send, via external interface 710, the positioning assistance data to one or more TRPs to be broadcast by the one or more TRPS.

The methodologies described herein may be implemented by various means depending upon the application. For example, these methodologies may be implemented in hardware, firmware, software, or any combination thereof. For a hardware implementation, the one or more processors 702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 720 or memory 704 that is connected to and executed by the one or more processors 702. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 708 on a non-transitory computer readable medium, such as medium 720 and/or memory 704. Examples include computer readable media encoded with a data structure and computer readable media encoded with a computer program 708. For example, the non-transitory computer readable medium including program code 708 stored thereon may include program code 708 to support positioning of the UE using broadcast positioning assistance data that includes information for aerial UEs and information for terrestrial UEs in a manner consistent with disclosed embodiments. Non-transitory computer readable medium 720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 708 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 720, instructions and/or data may be provided as signals on transmission media included in a communication apparatus. The instructions and data are configured to cause one or more processors to implement the functions outlined in the claims. That is, the communication apparatus includes transmission media with signals indicative of information to perform disclosed functions.

Memory 704 may represent any data storage mechanism. Memory 704 may include, for example, a primary memory and/or a secondary memory. Primary memory may include, for example, a random access memory, read only memory, etc. While illustrated in this example as being separate from one or more processors 702, it should be understood that all or part of a primary memory may be provided within or otherwise co-located/coupled with the one or more processors 702. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 720. As such, in certain example implementations, the methods and/or apparatuses presented herein may take the form in whole or part of a computer readable medium 720 that may include computer implementable code 708 stored thereon, which if executed by one or more processors 702 may be operatively enabled to perform all or portions of the example operations as described herein. Computer readable medium 720 may be a part of memory 704.

Figure 8:
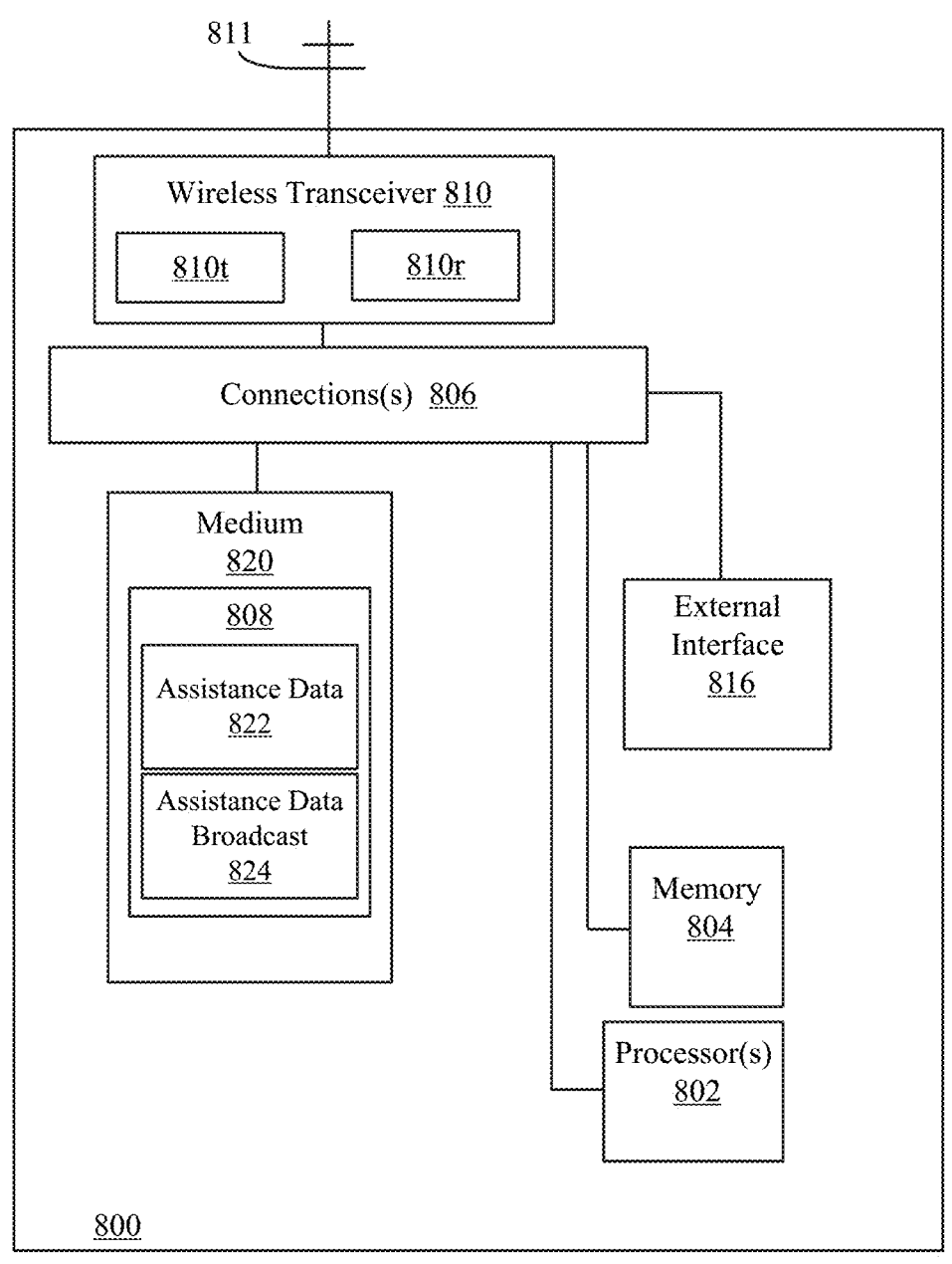
FIG. 8 shows a schematic block diagram illustrating certain exemplary features of a Transmission Reception Points (TRP) enabled to support positioning of the UE.

FIG. 8 shows a schematic block diagram illustrating certain exemplary features of a TRP 800, e.g., which may be, e.g., a base station 120, gNB 210, TRP 602, that is enabled to support positioning of the UE using broadcast positioning assistance data that includes information for aerial UEs and information for terrestrial UEs, as described herein. The TRP 800 may be configured to perform the signaling flow 600 shown in FIG. 6 and the process 1000 illustrated in FIG. 10. TRP 800 may, for example, include one or more processors 802, memory 804, an external interface, which may include a transceiver 810 (e.g., wireless network interface) and an external interface 816 (e.g., wireline or wireless network interface to other TRPs and/or the core network entities, such as LMF 220 via AMF 215), which may be operatively coupled with one or more connections 806 (e.g., buses, lines, fibers, links, etc.) to non-transitory computer readable medium 820 and memory 804. The TRP 800 may further include additional items, which are not shown, such as a user interface that may include e.g., a display, a keypad or other input device, such as virtual keypad on the display, through which a user may interface. In certain example implementations, all or part of TRP 800 may take the form of a chipset, and/or the like. Transceiver 810 may, for example, include a transmitter 810t enabled to transmit one or more signals over one or more types of wireless communication networks and a receiver 810r to receive one or more signals transmitted over the one or more types of wireless communication networks. The external interface 816 may be a wired or wireless interface capable of connecting to other TRPs in the RAN or network entities, such as a location server.

In some embodiments, TRP 800 may include antenna 811, which may be internal or external. Antenna 811 may be used to transmit and/or receive signals processed by transceiver 810. In some embodiments, antenna 811 may be coupled to transceiver 810. In some embodiments, measurements of signals received (transmitted) by TRP 800 may be performed at the point of connection of the antenna 811 and transceiver 810. For example, the measurement point of reference for received (transmitted) RF signal measurements may be an input (output) terminal of the receiver 810r (transmitter 810t and an output (input) terminal of the antenna 811. In a TRP 800 with multiple antennas 811 or antenna arrays, the antenna connector may be viewed as a virtual point representing the aggregate output (input) of multiple antennas. In some embodiments, TRP 800 may measure received signals including signal strength and TOA measurements and the raw measurements may be processed by the one or more processors 802.

The one or more processors 802 may be implemented using a combination of hardware, firmware, and software. For example, the one or more processors 802 may be configured to perform the functions discussed herein by implementing one or more instructions or program code 808 on a non-transitory computer readable medium, such as medium 820 and/or memory 804. In some embodiments, the one or more processors 802 may represent one or more circuits configurable to perform at least a portion of a data signal computing procedure or process related to the operation of TRP 800.

The medium 820 and/or memory 804 may store instructions or program code 808 that contain executable code or software instructions that when executed by the one or more processors 802 cause the one or more processors 802 to operate as a special purpose computer programmed to perform the techniques disclosed herein. As illustrated in TRP 800, the medium 820 and/or memory 804 may include one or more components or modules that may be implemented by the one or more processors 802 to perform the methodologies described herein. While the components or modules are illustrated as software in medium 820 that is executable by the one or more processors 802, it should be understood that the components or modules may be stored in memory 804 or may be dedicated hardware either in the one or more processors 802 or off the processors.

A number of software modules and data tables may reside in the medium 820 and/or memory 804 and be utilized by the one or more processors 802 in order to manage both communications and the functionality described herein. It should be appreciated that the organization of the contents of the medium 820 and/or memory 804 as shown in TRP 800 is merely exemplary, and as such the functionality of the modules and/or data structures may be combined, separated, and/or be structured in different ways depending upon the implementation of the TRP 800.

The medium 820 and/or memory 804 may include an assistance data module 822 that when implemented by the one or more processors 802 configures the one or more processors 802 to obtain, via external interface 816, positioning assistance data, e.g., from a location server, to be broadcast by the one or more TRPS, wherein the positioning assistance data includes information for aerial UEs and information for terrestrial UEs, e.g., as discussed in stages 1 and 2 in FIG. 6 and illustrated in reference to TABLEs 1-7. The information that is specific for positioning aerial UEs and information that may be used for positioning terrestrial (i.e., legacy) UEs may be partitioned, encoded and, if desired, ciphered, with the positioning assistance data into a number of posSIBs. The PRS related information that is specific for aerial UEs along with the PRS related information for terrestrial UEs may be encoded in the same or separate posSIBs.

The medium 820 and/or memory 804 may include an assistance data broadcast module 824 that when implemented by the one or more processors 802 configures the one or more processors 802 to broadcast, via transceiver 810, the positioning assistance data to be received by one or more UEs.

The methodologies described herein may be implemented by various means depending upon the application. For example, these methodologies may be implemented in hardware, firmware, software, or any combination thereof. For a hardware implementation, the one or more processors 802 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 820 or memory 804 that is connected to and executed by the one or more processors 802. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 808 on a non-transitory computer readable medium, such as medium 820 and/or memory 804. Examples include computer readable media encoded with a data structure and computer readable media encoded with a computer program 808. For example, the non-transitory computer readable medium including program code 808 stored thereon may include program code 808 to support positioning of the UE using broadcast positioning assistance data that includes information for aerial UEs and information for terrestrial UEs in a manner consistent with disclosed embodiments. Non-transitory computer readable medium 820 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 808 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 820, instructions and/or data may be provided as signals on transmission media included in a communication apparatus. For example, a communication apparatus may include a transceiver 810 having signals indicative of instructions and data. The instructions and data are configured to cause one or more processors to implement the functions outlined in the claims. That is, the communication apparatus includes transmission media with signals indicative of information to perform disclosed functions.

Memory 804 may represent any data storage mechanism. Memory 804 may include, for example, a primary memory and/or a secondary memory. Primary memory may include, for example, a random access memory, read only memory, etc. While illustrated in this example as being separate from one or more processors 802, it should be understood that all or part of a primary memory may be provided within or otherwise co-located/coupled with the one or more processors 802. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 820. As such, in certain example implementations, the methods and/or apparatuses presented herein may take the form in whole or part of a computer readable medium 820 that may include computer implementable code 808 stored thereon, which if executed by one or more processors 802 may be operatively enabled to perform all or portions of the example operations as described herein. Computer readable medium 820 may be a part of memory 804.

Figure 9:
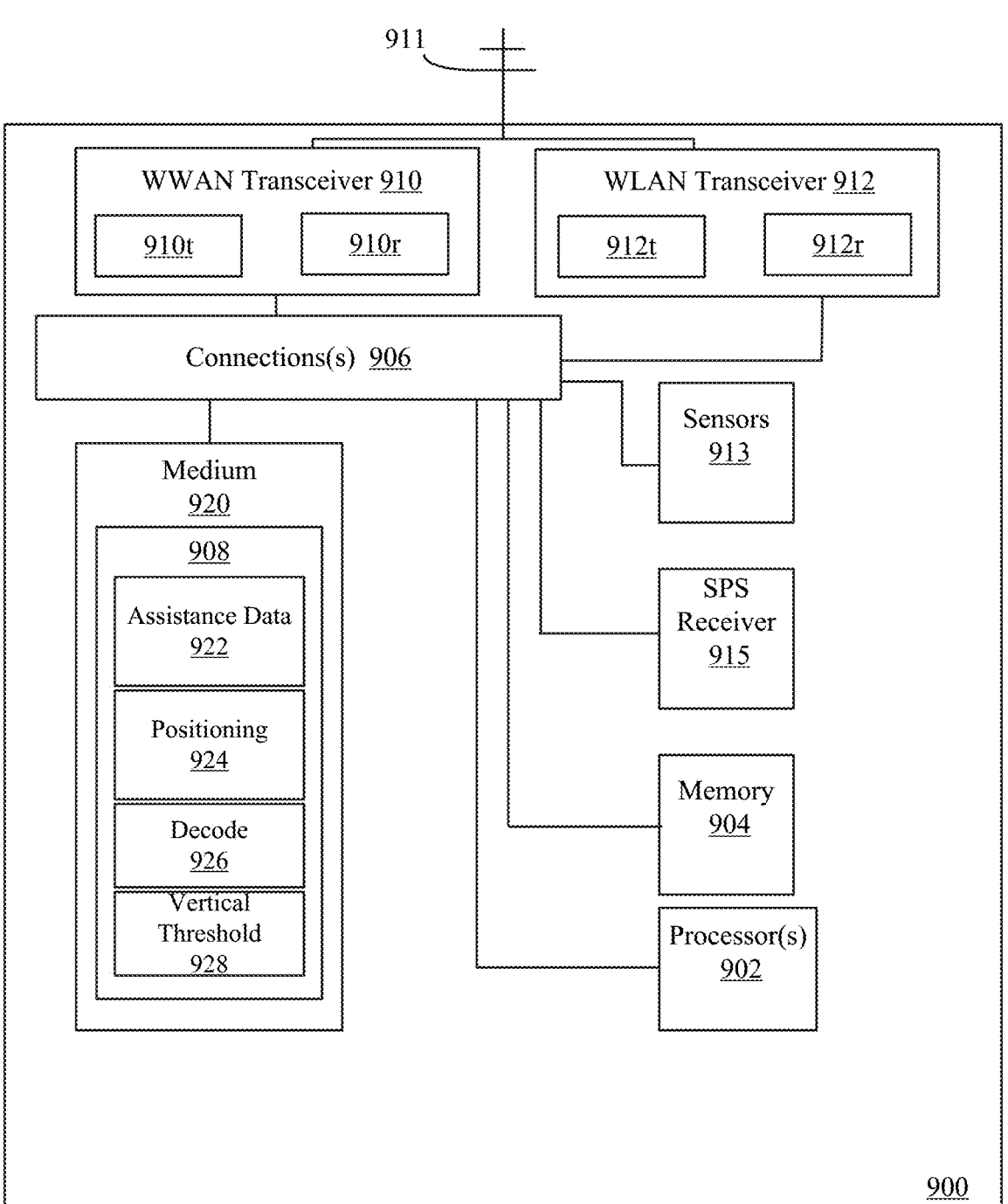
FIG. 9 shows a schematic block diagram illustrating certain exemplary features of a UE enabled to support positioning of the UE.

FIG. 9 shows a schematic block diagram illustrating certain exemplary features of a UE 900, e.g., which may be an aerial UE 105a or a terrestrial (e.g., legacy) UE 105t that supports positioning of the UE using broadcast positioning assistance data that includes information for aerial UEs and information for terrestrial UEs, as described herein. The UE 900, for example, may perform the signal flow 600 shown in FIG. 6 and the process flow 1100 shown in FIG. 11. The UE 900 may, for example, include one or more processors 902, memory 904, an external interface such as at least one wireless transceivers (e.g., wireless network interface) illustrated as WWAN transceiver 910 and WLAN transceiver 912, SPS receiver 915, and one or more sensors 913, which may be operatively coupled with one or more connections 906 (e.g., buses, lines, fibers, links, etc.) to non-transitory computer readable medium 920 and memory 904. The SPS receiver 915, for example, may receive and process SPS signals from SVs 190 shown in FIG. 1. The one or more sensors 913, for example, may be an inertial measurement unit (IMU) that may include one or more accelerometers, one or more gyroscopes, a magnetometer, etc. The UE 900 may further include additional items, which are not shown, such as a user interface that may include e.g., a display, a keypad or other input device, such as virtual keypad on the display, through which a user may interface with the UE. In certain example implementations, all or part of UE 900 may take the form of a chipset, and/or the like.

The UE 900 may include at least one wireless transceiver, such as transceiver 910 for a WWAN communication system and transceiver 912 for a WLAN communication system, or a combined a transceiver for both WWAN and WLAN. The WWAN transceiver 910 may include a transmitter 910t and receiver 910r coupled to one or more antennas 911 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The WLAN transceiver 912 may include a transmitter 912t and receiver 912r coupled to one or more antennas 911 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The transmitters 910t and 912t may include multiple transmitters that may be discrete components or combined/integrated components, and/or the receivers 910r and 912r may include multiple receivers that may be discrete components or combined/integrated components. The WWAN transceiver 910 may be configured to communicate signals (e.g., with base stations and/or one or more other devices) according to a variety of radio access technologies (RATs) such as 9G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), etc. New Radio may use mm-wave frequencies and/or sub-6 GHz frequencies. The WLAN transceiver 912 may be configured to communicate signals (e.g., with access points and/or one or more other devices) according to a variety of radio access technologies (RATs) such as 3GPP LTE-V2X (PC5), IEEE 902.11 (including IEEE 902.11p), WiFi, WiFi Direct (WiFi-D), Bluetooth®, Zigbee etc. The transceivers 910 and 912 may be communicatively coupled to a transceiver interface, e.g., by optical and/or electrical connection, which may be at least partially integrated with the transceivers 910 and 912.

In some embodiments, UE 900 may include antenna 911, which may be internal or external. UE antenna 911 may be used to transmit and/or receive signals processed by wireless transceivers 910 and 912. In some embodiments, UE antenna 911 may be coupled to wireless transceivers 910 and 912. In some embodiments, measurements of signals received (transmitted) by UE 900 may be performed at the point of connection of the UE antenna 911 and wireless transceivers 910 and 912. For example, the measurement point of reference for received (transmitted) RF signal measurements may be an input (output) terminal of the receiver 910r (transmitter 910t) and an output (input) terminal of the UE antenna 911. In a UE 900 with multiple UE antennas 911 or antenna arrays, the antenna connector may be viewed as a virtual point representing the aggregate output (input) of multiple UE antennas. In some embodiments, UE 900 may measure received signals including signal strength, TDOA, and TOA measurements, and angle related measurements for DL PRS and the raw measurements may be processed by the one or more processors 902.

The one or more processors 902 may be implemented using a combination of hardware, firmware, and software. For example, the one or more processors 902 may be configured to perform the functions discussed herein by implementing one or more instructions or program code 908 on a non-transitory computer readable medium, such as medium 920 and/or memory 904. In some embodiments, the one or more processors 902 may represent one or more circuits configurable to perform at least a portion of a data signal computing procedure or process related to the operation of UE 900.

The medium 920 and/or memory 904 may store instructions or program code 908 that contain executable code or software instructions that when executed by the one or more processors 902 cause the one or more processors 902 to operate as a special purpose computer programmed to perform the techniques disclosed herein. As illustrated in UE 900, the medium 920 and/or memory 904 may include one or more components or modules that may be implemented by the one or more processors 902 to perform the methodologies described herein. While the components or modules are illustrated as software in medium 920 that is executable by the one or more processors 902, it should be understood that the components or modules may be stored in memory 904 or may be dedicated hardware either in the one or more processors 902 or off the processors.

A number of software modules and data tables may reside in the medium 920 and/or memory 904 and be utilized by the one or more processors 902 in order to manage both communications and the functionality described herein. It should be appreciated that the organization of the contents of the medium 920 and/or memory 904 as shown in UE 900 is merely exemplary, and as such the functionality of the modules and/or data structures may be combined, separated, and/or be structured in different ways depending upon the implementation of the UE 900.

The medium 920 and/or memory 904 may include an assistance data module 922 that when implemented by the one or more processors 902 configures the one or more processors 902 to receive, via transceiver 910, positioning assistance data broadcast by a TRP, the positioning assistance data comprising information for aerial UEs and information for terrestrial UEs, e.g., as discussed in stages 1 and 3 in FIG. 6 and illustrated in reference to TABLEs 1-7. The information that is specific for positioning aerial UEs and information that may be used for positioning terrestrial (i.e., legacy) UEs may be partitioned, encoded and, if desired, ciphered, with the positioning assistance data into a number of posSIBs. The PRS related information that is specific for aerial UEs along with the PRS related information for terrestrial UEs may be encoded in the same or separate posSIBs.

The medium 920 and/or memory 904 may include a position module 924 that when implemented by the one or more processors 902 configures the one or more processors 902 to obtain downlink measurements using the positioning assistance data, e.g., via wireless transceivers 910, e.g., as discussed in stage 6 of FIG. 6. The one or more processors 902, for example, may be configured to obtain position measurements during a positioning session with a location server. The position measurements may include measurements of DL PRS may include measurements of signal strength parameters, RSRP, RSSI, RSRQ etc., timing related parameters, e.g., TOA, RSTD, etc., angle based parameters, e.g., AoD, AoA, or any combination thereof. The one or more processors 902 may further be configured to determine a position of the UE 900 including a vertical coordinate or vertical height of the UE 900 using the position measurements.

The medium 920 and/or memory 904 may include a decode module 926 that when implemented by the one or more processors 902 configures the one or more processors 902 to decode posSIBs that include information for the aerial UEs and/or information for the terrestrial UEs.

The medium 920 and/or memory 904 may include a vertical threshold module 928 that when implemented by the one or more processors 902 configures the one or more processors 902 to determine whether the vertical coordinate is greater than a predetermined vertical threshold (e.g., received with the assistance data) to determine if the information for the aerial UEs may be accessed or less than the predetermined vertical threshold to determine if the information for the terrestrial UEs should be accessed.

The methodologies described herein may be implemented by various means depending upon the application. For example, these methodologies may be implemented in hardware, firmware, software, or any combination thereof. For a hardware implementation, the one or more processors 902 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 920 or memory 904 that is connected to and executed by the one or more processors 902. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 908 on a non-transitory computer readable medium, such as medium 920 and/or memory 904. Examples include computer readable media encoded with a data structure and computer readable media encoded with a computer program 908. For example, the non-transitory computer readable medium including program code 908 stored thereon may include program code 908 to support positioning of the UE using broadcast positioning assistance data that includes information for aerial UEs and information for terrestrial UEs in a manner consistent with disclosed embodiments. Non-transitory computer readable medium 920 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 908 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 920, instructions and/or data may be provided as signals on transmission media included in a communication apparatus. For example, a communication apparatus may include a wireless transceiver 910 having signals indicative of instructions and data. The instructions and data are configured to cause one or more processors to implement the functions outlined in the claims. That is, the communication apparatus includes transmission media with signals indicative of information to perform disclosed functions.

Memory 904 may represent any data storage mechanism. Memory 904 may include, for example, a primary memory and/or a secondary memory. Primary memory may include, for example, a random access memory, read only memory, etc. While illustrated in this example as being separate from one or more processors 902, it should be understood that all or part of a primary memory may be provided within or otherwise co-located/coupled with the one or more processors 902. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 920. As such, in certain example implementations, the methods and/or apparatuses presented herein may take the form in whole or part of a computer readable medium 920 that may include computer implementable code 908 stored thereon, which if executed by one or more processors 902 may be operatively enabled to perform all or portions of the example operations as described herein. Computer readable medium 920 may be a part of memory 904.

FIG. 10 shows a flow diagram for an exemplary method 1000 performed by a network entity in wireless network for positioning one or more UEs including an aerial UE, in a manner consistent with disclosed implementations. The network entity, for example, may be a location server, such as location server 160 or LMF 220, or a TRP, such as one of base stations 120 or gNBs 210. The aerial UE may be aerial UE 105a, which may be, e.g., an unmanned aerial vehicle (UAV), a drone, helicopter, multi-rotor copter (e.g., quad-copter), balloon, blimp, dirigible, fixed-wing aircraft, or any other vehicle capable of flying and capable of positioning.

At block 1002, the network entity obtains positioning assistance data to be broadcast by one or more Transmission Reception Points (TRPs), the positioning assistance data comprising information for aerial UEs and information for terrestrial UEs, e.g., as discussed in stage 1 in FIG. 6 and illustrated in reference to TABLEs 1-7. A means for obtaining positioning assistance data to be broadcast by one or more Transmission Reception Points (TRPs), the positioning assistance data comprising information for aerial UEs and information for terrestrial UEs may include, e.g., the external interface 710 and one or more processors 702 with dedicated hardware or implementing executable code or software instructions in memory 704 and/or medium 720 in location server 700, such as the assistance data module 722, shown in FIG. 7, or the external interface 816 and one or more processors 802 with dedicated hardware or implementing executable code or software instructions in memory 804 and/or medium 820 in TRP 800, such as the assistance data module 822, shown in FIG. 8.

At block 1004, the network entity sends the positioning assistance data, e.g., as discussed in stage 2 or stage 3 of FIG. 6. For example, in one implementation, the network entity may be a location server, and the positioning assistance is obtained by configuring the positioning assistance data, and wherein the positioning assistance data is sent to one or more TRPs for broadcasting, e.g., as discussed in stages 1 and 2 of FIG. 6. In one implementation, the network entity may be a TRP, and the positioning assistance may be obtained by receiving the positioning assistance data from a location server, and the positioning assistance data is sent by broadcasting the positioning assistance data, e.g., as discussed in stages 2 and 3 of FIG. 6. A means for sending the positioning assistance data may include, e.g., the external interface 710 and one or more processors 702 with dedicated hardware or implementing executable code or software instructions in memory 704 and/or medium 720 in location server 700, such as the assistance data send module 722, shown in FIG. 7, or the wireless transceiver 810 and one or more processors 802 with dedicated hardware or implementing executable code or software instructions in memory 804 and/or medium 820 in TRP 800, such as the assistance data broadcast module 824, shown in FIG. 8

In one implementation, the positioning assistance data may be partitioned into a plurality of positioning System Information Blocks (posSIBs) and the information for the aerial UEs and information for the terrestrial UEs may be provided together in the posSIBs, e.g., as discussed in stage 1 of FIG. 6 and illustrated in reference to Tables 1-7. In one implementation, the positioning assistance data is partitioned into a plurality of positioning System Information Blocks (posSIBs) and the information for the aerial UEs and information for the terrestrial UEs are provided separately in different posSIBs, e.g., as discussed in stage 1 of FIG. 6.

In one implementation, the positioning assistance data may comprise a first list of positioning assistance data per frequency layer for aerial UEs that is different than a second list of positioning assistance data per frequency layer for terrestrial UEs, e.g., as discussed in stage 1 of FIG. 6. For example, the information for aerial UEs may comprise a first set of TRPs that are configured for positioning aerial UEs and downlink reference signal configurations per TRP in the first set of TRPs, wherein the first set of TRPs and downlink reference signal configurations per TRP is listed separately from a second set of TRPs and downlink reference signal configurations per TRP that are configured for positioning terrestrial UEs, e.g., as discussed in stage 1 of FIG. 6 and discussed in reference to Tables 1-4.

In one implementation, the information for aerial UEs may comprise a first set of downlink reference signal configurations per TRP that are configured for positioning aerial UEs, wherein the first set of downlink reference signal configurations per TRP is listed separately from a second set of downlink reference signal configurations per TRP that are configured for positioning terrestrial UEs, e.g., as discussed in stage 1 of FIG. 6 and discussed in reference to Table 5.

In one implementation, the positioning assistance data may comprise a first set of TRPs that are configured for positioning both aerial UEs and terrestrial UEs, and the information for aerial UEs comprises identifiers for the TRPs that are configured for positioning aerial UEs from the first set of TRPs, e.g., as discussed in stage 1 of FIG. 6 and discussed in reference to Table 6. The information for aerial UEs may further comprise an indication of a priority of the TRPs that are configured for positioning aerial UEs, e.g., as discussed in stage 1 of FIG. 6 discussed in reference to Table 6. The positioning assistance data may further comprise a second set of TRPs that are configured for positioning only aerial UEs, e.g., as discussed in stage 1 of FIG. 6 and discussed in reference to Table 6. For example, the information for aerial UEs may further comprise an indication of a priority of TRPs that are configured for positioning aerial UEs in the first set of TRPs and the TRPs in the second set of TRPs, e.g., as discussed in stage 1 of FIG. 6 and discussed in reference to Table 6.

In one implementation, the positioning assistance data may comprise a first set of TRPs that are configured for positioning both aerial UEs and terrestrial UEs and an indication of a priority of the TRPs that are configured for positioning aerial UEs, e.g., as discussed in stage 1 of FIG. 6 and discussed in reference to Table 6.

In one implementation, the positioning assistance data may comprise downlink reference signal configurations per TRPs, and wherein the information for the aerial UEs may comprise identifiers for downlink reference signal configurations that are configured for positioning aerial UEs, e.g., as discussed in stage 1 of FIG. 6 and discussed in reference to Table 7. The information for aerial UEs may further comprise an indication of a priority of the downlink reference signal configurations that are configured for positioning aerial UEs, e.g., as discussed in stage 1 of FIG. 6 and discussed in reference to Table 7. The downlink reference signal configurations for example, may be downlink positioning resource sets.

Figure 11:
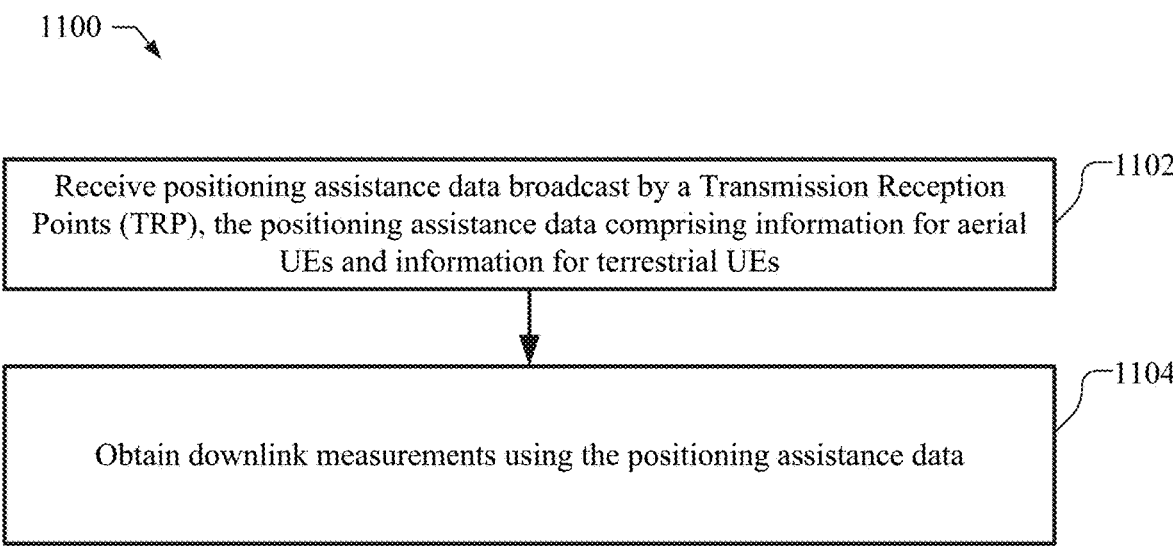
FIG. 11 shows a flow diagram for an exemplary method performed by a UE in wireless network for positioning.

FIG. 11 shows a flow diagram for an exemplary method 1100 performed by a UE in a wireless network for positioning, in a manner consistent with disclosed implementations. The UE, for example, may be an aerial UE 105*a*, which may be, e.g., an unmanned aerial vehicle (UAV), a drone, helicopter, multi-rotor copter (e.g., quadcopter), balloon, blimp, dirigible, fixed-wing aircraft, or any other vehicle capable of flying and capable of positioning.

At block 1102, the UE receives positioning assistance data broadcast by a Transmission Reception Points (TRP), the positioning assistance data comprising information for aerial UEs and information for terrestrial UEs, e.g., as discussed in stages 1-3 in FIG. 6 and illustrated in reference to TABLEs 1-7. The TRP, for example, may be one of base stations 120 or gNBs 210. A means for receiving positioning assistance data broadcast by a Transmission Reception Points (TRP), the positioning assistance data comprising information for aerial UEs and information for terrestrial UEs may include the wireless transceiver 910 and one or more processors 902 with dedicated hardware or implementing executable code or software instructions in memory 904 and/or medium 920 in UE 900, such as the assistance data module 922, shown in FIG. 9.

At block 1104, the UE obtains downlink measurements using the positioning assistance data, e.g., as discussed in stage 6 of FIG. 6. A means for obtaining downlink measurements using the positioning assistance data may include the wireless transceiver 910 and one or more processors 902 with dedicated hardware or implementing executable code or software instructions in memory 904 and/or medium 920 in UE 900, such as the positioning module 924, shown in FIG. 9.

In one implementation, the positioning assistance data may be partitioned into a plurality of positioning System Information Blocks (posSIBs) broadcast by the TRP and the information for the aerial UEs and information for the terrestrial UEs may be received together in the posSIBs, e.g., as discussed in stage 1 of FIG. 6 and illustrated in reference to Tables 1-7. In one implementation, the positioning assistance data is partitioned into a plurality of positioning System Information Blocks (posSIBs) broadcast by the TRP and the information for the aerial UEs and information for the terrestrial UEs are received separately in different posSIBs, e.g., as discussed in stage 1 of FIG. 6.

In one implementation, the UE may be an aerial UE and may decodes only the posSIBs that include the information for the aerial UEs, e.g., as discussed in stage 3 of FIG. 6. A means for decoding only the posSIBs that include the information for the aerial UEs may include the one or more processors 902 with dedicated hardware or implementing executable code or software instructions in memory 904 and/or medium 920 in UE 900, such as the decode module 926, shown in FIG. 9.

In one implementation, the UE may be a terrestrial UE and may decode only the posSIBs that include the information for the terrestrial UEs, e.g., as discussed in stage 3 of FIG. 6. A means for decoding only the posSIBs that include the information for the terrestrial UEs may include the one or more processors 902 with dedicated hardware or implementing executable code or software instructions in memory

904 and/or medium 920 in UE 900, such as the decode module 926, shown in FIG. 9.

In one implementation, the UE may be an aerial UE and may access the information for the aerial UEs based on a subscription, e.g., as discussed in stage 3 of FIG. 6.

In one implementation, the UE may be an aerial UE and may determine a vertical coordinate for the aerial UE, e.g., as discussed in stage 3 of FIG. 6. The UE may determine if the vertical coordinate for the aerial UE is greater than a threshold, e.g., as discussed in stage 3 of FIG. 6. The information for the aerial UEs may be accessed if the vertical coordinate for the aerial UE is greater than the threshold and the information for the terrestrial UEs may be accessed if the vertical coordinate for the aerial UE is less than the threshold, e.g., as discussed in stage 3 of FIG. 6. A means for determining a vertical coordinate for the aerial UE may include the wireless transceiver 910 and one or more processors 902 with dedicated hardware or implementing executable code or software instructions in memory 904 and/or medium 920 in UE 900, such as the positioning module 924, shown in FIG. 9. A means for determining if the vertical coordinate for the aerial UE is greater than a threshold may include the one or more processors 902 with dedicated hardware or implementing executable code or software instructions in memory 904 and/or medium 920 in UE 900, such as the vertical threshold module 928, shown in FIG. 9.

In one implementation, the positioning assistance data may comprise a first list of positioning assistance data per frequency layer for aerial UEs that is different than a second list of positioning assistance data per frequency layer for terrestrial UEs, e.g., as discussed in stage 1 of FIG. 6. For example, the information for aerial UEs may comprise a first set of TRPs that are configured for positioning aerial UEs and downlink reference signal configurations per TRP in the first set of TRPs, wherein the first set of TRPs and downlink reference signal configurations per TRP is listed separately from a second set of TRPs and downlink reference signal configurations per TRP that are configured for positioning terrestrial UEs, e.g., as discussed in stage 1 of FIG. 6 and discussed in reference to Tables 1-4.

In one implementation, the information for aerial UEs may comprise a first set of downlink reference signal configurations per TRP that are configured for positioning aerial UEs, wherein the first set of downlink reference signal configurations per TRP is listed separately from a second set of downlink reference signal configurations per TRP that are configured for positioning terrestrial UEs, e.g., as discussed in stage 1 of FIG. 6 and discussed in reference to Table 5.

In one implementation, the positioning assistance data may comprise a first set of TRPs that are configured for positioning both aerial UEs and terrestrial UEs, and the information for aerial UEs comprises identifiers for the TRPs that are configured for positioning aerial UEs from the first set of TRPs, e.g., as discussed in stage 1 of FIG. 6 and discussed in reference to Table 6. The information for aerial UEs may further comprise an indication of a priority of the TRPs that are configured for positioning aerial UEs, e.g., as discussed in stage 1 of FIG. 6 discussed in reference to Table 6. The positioning assistance data may further comprise a second set of TRPs that are configured for positioning only aerial UEs, e.g., as discussed in stage 1 of FIG. 6 and discussed in reference to Table 6. For example, the information for aerial UEs may further comprise an indication of a priority of TRPs that are configured for positioning aerial UEs in the first set of TRPs and the TRPs in the second set of TRPs, e.g., as discussed in stage 1 of FIG. 6 and discussed in reference to Table 6.

In one implementation, the positioning assistance data may comprise a first set of TRPs that are configured for positioning both aerial UEs and terrestrial UEs and an indication of a priority of the TRPs that are configured for positioning aerial UEs, e.g., as discussed in stage 1 of FIG. 6 and discussed in reference to Table 6.

In one implementation, the positioning assistance data may comprise downlink reference signal configurations per TRPs, and wherein the information for the aerial UEs may comprise identifiers for downlink reference signal configurations that are configured for positioning aerial UEs, e.g., as discussed in stage 1 of FIG. 6 and discussed in reference to Table 7. The information for aerial UEs may further comprise an indication of a priority of the downlink reference signal configurations that are configured for positioning aerial UEs, e.g., as discussed in stage 1 of FIG. 6 and discussed in reference to Table 7. The downlink reference signal configurations for example, may be downlink positioning resource sets.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, nonvolatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method performed by a network entity in a wireless network for positioning one or more user equipments (UEs) including an aerial UE, the method comprising: obtaining positioning assistance data to be broadcast by one or more Transmission Reception Points (TRPs), the positioning assistance data comprising information for aerial UEs and information for terrestrial UEs; and sending the positioning assistance data.

Clause 2. The method of clause 1, wherein the network entity is a location server, and obtaining positioning assistance comprises configuring the positioning assistance data, and wherein the positioning assistance data is sent to one or more TRPs for broadcasting.

Clause 3. The method of clause 1, wherein the network entity is a TRP, and obtaining the positioning assistance comprises receiving the positioning assistance data from a location server, and sending the positioning assistance data comprises broadcasting the positioning assistance data.

Clause 4. The method of any of clauses 1-3, wherein the positioning assistance data is partitioned into a plurality of positioning System Information Blocks (posSIBs) and wherein the information for the aerial UEs and information for the terrestrial UEs are provided together in the posSIBs.

Clause 5. The method of any of clauses 1-3, wherein the positioning assistance data is partitioned into a plurality of positioning System Information Blocks (posSIBs) and wherein the information for the aerial UEs and information for the terrestrial UEs are provided separately in different posSIBs.

Clause 6. The method of any of clauses 1-5, wherein the positioning assistance data comprises a first list of positioning assistance data per frequency layer for aerial UEs that is different than a second list of positioning assistance data per frequency layer for terrestrial UEs.

Clause 7. The method of clause 6, wherein the information for aerial UEs comprises a first set of TRPs that are configured for positioning aerial UEs and downlink reference signal configurations per TRP in the first set of TRPs, wherein the first set of TRPs and downlink reference signal configurations per TRP is listed separately from a second set of TRPs and downlink reference signal configurations per TRP that are configured for positioning terrestrial UEs.

Clause 8. The method of any of clauses 1-7, wherein the information for aerial UEs comprises a first set of downlink reference signal configurations per TRP that are configured for positioning aerial UEs, wherein the first set of downlink reference signal configurations per TRP is listed separately from a second set of downlink reference signal configurations per TRP that are configured for positioning terrestrial UEs.

Clause 9. The method of any of clauses 1-8, wherein the positioning assistance data comprises a first set of TRPs that are configured for positioning both aerial UEs and terrestrial UEs, and the information for aerial UEs comprises identifiers for the TRPs that are configured for positioning aerial UEs from the first set of TRPs.

Clause 10. The method of clause 9, wherein the information for aerial UEs further comprises an indication of a priority of the TRPs that are configured for positioning aerial UEs.

Clause 11. The method of clause 9, wherein the positioning assistance data further comprises a second set of TRPs that are configured for positioning only aerial UEs.

Clause 12. The method of clause 11, wherein the information for aerial UEs further comprises an indication of a priority of TRPs that are configured for positioning aerial UEs in the first set of TRPs and the TRPs in the second set of TRPs.

Clause 13. The method of any of clauses 1-12, wherein the positioning assistance data comprises a first set of TRPs that are configured for positioning both aerial UEs and terrestrial UEs and an indication of a priority of the TRPs that are configured for positioning aerial UEs.

Clause 14. The method of any of clauses 1-13, wherein the positioning assistance data comprises downlink reference signal configurations per TRPs, and wherein the information for the aerial UEs comprises identifiers for downlink reference signal configurations that are configured for positioning aerial UEs.

Clause 15. The method of clause 14, wherein the information for aerial UEs further comprises an indication of a priority of the downlink reference signal configurations that are configured for positioning aerial UEs.

Clause 16. The method of clause 14, wherein the downlink reference signal configurations comprise downlink positioning resource sets.

Clause 17. A network entity in a wireless network configured for positioning one or more user equipments (UEs)

including an aerial UE, comprising: an external interface configured to communicate with entities in the wireless network; at least one memory; and at least one processor coupled to the external interface and the at least one memory and configured to: obtain, via the external interface, positioning assistance data to be broadcast by one or more Transmission Reception Points (TRPs), the positioning assistance data comprising information for aerial UEs and information for terrestrial UEs; and send, via the external interface, the positioning assistance data.

Clause 18. The network entity of clause 17, wherein the network entity is a location server, and the at least one processor is configured to obtain positioning assistance by being configured to configure the positioning assistance data, and wherein the positioning assistance data is sent to one or more TRPs for broadcasting.

Clause 19. The network entity of clause 17, wherein the network entity is a TRP, and the at least one processor is configured to obtain the positioning assistance by being configured to receive, via the external interface, the positioning assistance data from a location server, and the at least one processor is configured to send the positioning assistance data by being configured to broadcast the positioning assistance data.

Clause 20. The network entity of any of clauses 17-19, wherein the positioning assistance data is partitioned into a plurality of positioning System Information Blocks (pos-SIBs) and wherein the information for the aerial UEs and information for the terrestrial UEs are provided together in the posSIBs.

Clause 21. The network entity of any of clauses 17-19, wherein the positioning assistance data is partitioned into a plurality of positioning System Information Blocks (pos-SIBs) and wherein the information for the aerial UEs and information for the terrestrial UEs are provided separately in different posSIBs.

Clause 22. The network entity of any of clauses 17-21, wherein the positioning assistance data comprises a first list of positioning assistance data per frequency layer for aerial UEs that is different than a second list of positioning assistance data per frequency layer for terrestrial UEs.

Clause 23. The network entity of clause 22, wherein the information for aerial UEs comprises a first set of TRPs that are configured for positioning aerial UEs and downlink reference signal configurations per TRP in the first set of TRPs, wherein the first set of TRPs and downlink reference signal configurations per TRP is listed separately from a second set of TRPs and downlink reference signal configurations per TRP that are configured for positioning terrestrial UEs.

Clause 24. The network entity of any of clauses 17-23, wherein the information for aerial UEs comprises a first set of downlink reference signal configurations per TRP that are configured for positioning aerial UEs, wherein the first set of downlink reference signal configurations per TRP is listed separately from a second set of downlink reference signal configurations per TRP that are configured for positioning terrestrial UEs.

Clause 25. The network entity of any of clauses 17-24, wherein the positioning assistance data comprises a first set of TRPs that are configured for positioning both aerial UEs and terrestrial UEs, and the information for aerial UEs comprises identifiers for the TRPs that are configured for positioning aerial UEs from the first set of TRPs.

Clause 26. The network entity of clause 25, wherein the information for aerial UEs further comprises an indication of a priority of the TRPs that are configured for positioning aerial UEs.

Clause 27. The network entity of clause 25, wherein the positioning assistance data further comprises a second set of TRPs that are configured for positioning only aerial UEs.

Clause 28. The network entity of clause 27, wherein the information for aerial UEs further comprises an indication of a priority of TRPs that are configured for positioning aerial UEs in the first set of TRPs and the TRPs in the second set of TRPs.

Clause 29. The network entity of any of clauses 17-28, wherein the positioning assistance data comprises a first set of TRPs that are configured for positioning both aerial UEs and terrestrial UEs and an indication of a priority of the TRPs that are configured for positioning aerial UEs.

Clause 30. The network entity of any of clauses 17-29, wherein the positioning assistance data comprises downlink reference signal configurations per TRPs, and wherein the information for the aerial UEs comprises identifiers for downlink reference signal configurations that are configured for positioning aerial UEs.

Clause 31. The network entity of clause 30, wherein the information for aerial UEs further comprises an indication of a priority of the downlink reference signal configurations that are configured for positioning aerial UEs.

Clause 32. The network entity of clause 31, wherein the downlink reference signal configurations comprise downlink positioning resource sets.

Clause 33. A network entity in a wireless network configured for positioning one or more user equipments (UEs) including an aerial UE, comprising: means for obtaining positioning assistance data to be broadcast by one or more Transmission Reception Points (TRPs), the positioning assistance data comprising information for aerial UEs and information for terrestrial UEs; and means for sending the positioning assistance data.

Clause 34. The network entity of clause 33, wherein the network entity is a location server, and the means for obtaining positioning assistance configures the positioning assistance data, and wherein the positioning assistance data is sent to one or more TRPs for broadcasting.

Clause 35. The network entity of clause 33, wherein the network entity is a TRP, and the means for obtaining the positioning assistance comprises receives the positioning assistance data from a location server, and the means for sending the positioning assistance data broadcasts the positioning assistance data.

Clause 36. The network entity of any of clauses 33-35, wherein the positioning assistance data is partitioned into a plurality of positioning System Information Blocks (pos-SIBs) and wherein the information for the aerial UEs and information for the terrestrial UEs are provided together in the posSIBs.

Clause 37. The network entity of any of clauses 33-35, wherein the positioning assistance data is partitioned into a plurality of positioning System Information Blocks (pos-SIBs) and wherein the information for the aerial UEs and information for the terrestrial UEs are provided separately in different posSIBs.

Clause 38. The network entity of any of clauses 33-37, wherein the positioning assistance data comprises a first list of positioning assistance data per frequency layer for aerial UEs that is different than a second list of positioning assistance data per frequency layer for terrestrial UEs.

Clause 39. The network entity of clause 38, wherein the information for aerial UEs comprises a first set of TRPs that are configured for positioning aerial UEs and downlink reference signal configurations per TRP in the first set of TRPs, wherein the first set of TRPs and downlink reference signal configurations per TRP is listed separately from a second set of TRPs and downlink reference signal configurations per TRP that are configured for positioning terrestrial UEs.

Clause 40. The network entity of any of clauses 33-39, wherein the information for aerial UEs comprises a first set of downlink reference signal configurations per TRP that are configured for positioning aerial UEs, wherein the first set of downlink reference signal configurations per TRP is listed separately from a second set of downlink reference signal configurations per TRP that are configured for positioning terrestrial UEs.

Clause 41. The network entity of any of clauses 33-40, wherein the positioning assistance data comprises a first set of TRPs that are configured for positioning both aerial UEs and terrestrial UEs, and the information for aerial UEs comprises identifiers for the TRPs that are configured for positioning aerial UEs from the first set of TRPs.

Clause 42. The network entity of clause 41, wherein the information for aerial UEs further comprises an indication of a priority of the TRPs that are configured for positioning aerial UEs.

Clause 43. The network entity of clause 41, wherein the positioning assistance data further comprises a second set of TRPs that are configured for positioning only aerial UEs.

Clause 44. The network entity of clause 43, wherein the information for aerial UEs further comprises an indication of a priority of TRPs that are configured for positioning aerial UEs in the first set of TRPs and the TRPs in the second set of TRPs.

Clause 45. The network entity of any of clauses 33-44, wherein the positioning assistance data comprises a first set of TRPs that are configured for positioning both aerial UEs and terrestrial UEs and an indication of a priority of the TRPs that are configured for positioning aerial UEs.

Clause 46. The network entity of any of clauses 33-45, wherein the positioning assistance data comprises downlink reference signal configurations per TRPs, and wherein the information for the aerial UEs comprises identifiers for downlink reference signal configurations that are configured for positioning aerial UEs.

Clause 47. The network entity of clause 46, wherein the information for aerial UEs further comprises an indication of a priority of the downlink reference signal configurations that are configured for positioning aerial UEs.

Clause 48. The network entity of clause 47, wherein the downlink reference signal configurations comprise downlink positioning resource sets.

Clause 49. A non-transitory storage medium including program code stored thereon, the program code is operable to configure at least one processor in a network entity in a wireless network for positioning one or more user equipments (UEs) including an aerial UE, the program code comprising instruction to: obtain positioning assistance data to be broadcast by one or more Transmission Reception Points (TRPs), the positioning assistance data comprising information for aerial UEs and information for terrestrial UEs; and send the positioning assistance data.

Clause 50. The non-transitory storage medium of clause 49, wherein the network entity is a location server, and the instructions to obtain positioning assistance configure the positioning assistance data, and wherein the positioning assistance data is sent to one or more TRPs for broadcasting.

Clause 51. The non-transitory storage medium of clause 49, wherein the network entity is a TRP, and the instructions to obtain the positioning assistance comprise instruction to receive the positioning assistance data from a location server, and the instructions to send the positioning assistance data configures the at least one processor in the TRP to broadcast the positioning assistance data.

Clause 52. The non-transitory storage medium of any of clauses 49-51, wherein the positioning assistance data is partitioned into a plurality of positioning System Information Blocks (posSIBs) and wherein the information for the aerial UEs and information for the terrestrial UEs are provided together in the posSIBs.

Clause 53. The non-transitory storage medium of any of clauses 49-51, wherein the positioning assistance data is partitioned into a plurality of positioning System Information Blocks (posSIBs) and wherein the information for the aerial UEs and information for the terrestrial UEs are provided separately in different posSIBs.

Clause 54. The non-transitory storage medium of any of clauses 49-53, wherein the positioning assistance data comprises a first list of positioning assistance data per frequency layer for aerial UEs that is different than a second list of positioning assistance data per frequency layer for terrestrial UEs.

Clause 55. The non-transitory storage medium of clause 54, wherein the information for aerial UEs comprises a first set of TRPs that are configured for positioning aerial UEs and downlink reference signal configurations per TRP in the first set of TRPs, wherein the first set of TRPs and downlink reference signal configurations per TRP is listed separately from a second set of TRPs and downlink reference signal configurations per TRP that are configured for positioning terrestrial UEs.

Clause 56. The non-transitory storage medium of any of clauses 49-55, wherein the information for aerial UEs comprises a first set of downlink reference signal configurations per TRP that are configured for positioning aerial UEs, wherein the first set of downlink reference signal configurations per TRP is listed separately from a second set of downlink reference signal configurations per TRP that are configured for positioning terrestrial UEs.

Clause 57. The non-transitory storage medium of any of clauses 49-56, wherein the positioning assistance data comprises a first set of TRPs that are configured for positioning both aerial UEs and terrestrial UEs, and the information for aerial UEs comprises identifiers for the TRPs that are configured for positioning aerial UEs from the first set of TRPs.

Clause 58. The non-transitory storage medium of clause 57, wherein the information for aerial UEs further comprises an indication of a priority of the TRPs that are configured for positioning aerial UEs.

Clause 59. The non-transitory storage medium of clause 57, wherein the positioning assistance data further comprises a second set of TRPs that are configured for positioning only aerial UEs.

Clause 60. The non-transitory storage medium of clause 59, wherein the information for aerial UEs further comprises an indication of a priority of TRPs that are configured for positioning aerial UEs in the first set of TRPs and the TRPs in the second set of TRPs.

Clause 61. The non-transitory storage medium of any of clauses 49-60, wherein the positioning assistance data comprises a first set of TRPs that are configured for positioning both aerial UEs and terrestrial UEs and an indication of a priority of the TRPs that are configured for positioning aerial UEs.

Clause 62. The non-transitory storage medium of any of clauses 49-61, wherein the positioning assistance data comprises downlink reference signal configurations per TRPs, and wherein the information for the aerial UEs comprises identifiers for downlink reference signal configurations that are configured for positioning aerial UEs.

Clause 63. The non-transitory storage medium of clause 62, wherein the information for aerial UEs further comprises an indication of a priority of the downlink reference signal configurations that are configured for positioning aerial UEs.

Clause 64. The non-transitory storage medium of clause 63, wherein the downlink reference signal configurations comprise downlink positioning resource sets.

Clause 65. A method performed by a user equipment (UE) in a wireless network for positioning, the method comprising: receiving positioning assistance data broadcast by a Transmission Reception Points (TRP), the positioning assistance data comprising information for aerial UEs and information for terrestrial UEs; and obtaining downlink measurements using the positioning assistance data.

Clause 66. The method of clause 65, wherein the positioning assistance data is partitioned into a plurality of positioning System Information Blocks (posSIBs) broadcast by the TRP and wherein the information for the aerial UEs and information for the terrestrial UEs are received together in the posSIBs.

Clause 67. The method of clause 65, wherein the positioning assistance data is partitioned into a plurality of positioning System Information Blocks (posSIBs) broadcast by the TRP and wherein the information for the aerial UEs and information for the terrestrial UEs are received separately in different posSIBs.

Clause 68. The method of clause 67, wherein the UE is an aerial UE, the method further comprising decoding only the posSIBs that include the information for the aerial UEs.

Clause 69. The method of clause 67, wherein the UE is a terrestrial UE, the method further comprising decoding only the posSIBs that include the information for the terrestrial UEs.

Clause 70. The method of any of clauses 65-69, wherein the UE is an aerial UE and accesses the information for the aerial UEs based on a subscription.

Clause 71. The method of any of clauses 65-70, wherein the UE is an aerial UE, the method further comprising: determining a vertical coordinate for the aerial UE; determining if the vertical coordinate for the aerial UE is greater than a threshold; wherein the information for the aerial UEs is accessed if the vertical coordinate for the aerial UE is greater than the threshold and the information for the terrestrial UEs is accessed if the vertical coordinate for the aerial UE is less than the threshold.

Clause 72. The method of any of clauses 65-71, wherein the positioning assistance data comprises a first list of positioning assistance data per frequency layer for aerial UEs that is different than a second list of positioning assistance data per frequency layer for terrestrial UEs.

Clause 73. The method of clause 72, wherein the information for aerial UEs comprises a first set of TRPs that are configured for positioning aerial UEs and downlink reference signal configurations per TRP in the first set of TRPs, wherein the first set of TRPs and downlink reference signal configurations per TRP is listed separately from a second set of TRPs and downlink reference signal configurations per TRP that are configured for positioning terrestrial UEs.

Clause 74. The method of any of clauses 65-73, wherein the information for aerial UEs comprises a first set of downlink reference signal configurations per TRP that are configured for positioning aerial UEs, wherein the first set of downlink reference signal configurations per TRP is listed separately from a second set of downlink reference signal configurations per TRP that are configured for positioning terrestrial UEs.

Clause 75. The method of any of clauses 65-74, wherein the positioning assistance data comprises a first set of TRPs that are configured for positioning both aerial UEs and terrestrial UEs, and the information for aerial UEs comprises identifiers for the TRPs that are configured for positioning aerial UEs from the first set of TRPs.

Clause 76. The method of clause 75, wherein the information for aerial UEs further comprises an indication of a priority of the TRPs that are configured for positioning aerial UEs.

Clause 77. The method of clause 75, wherein the positioning assistance data further comprises a second set of TRPs that are configured for positioning only aerial UEs.

Clause 78. The method of clause 77, wherein the information for aerial UEs further comprises an indication of a priority of TRPs that are configured for positioning aerial UEs in the first set of TRPs and the TRPs in the second set of TRPs.

Clause 79. The method of any of clauses 65-78, wherein the positioning assistance data comprises a first set of TRPs that are configured for positioning both aerial UEs and terrestrial UEs and an indication of a priority of the TRPs that are configured for positioning aerial UEs.

Clause 80. The method of any of clauses 65-79, wherein the positioning assistance data comprises downlink reference signal configurations per TRPs, and wherein the information for the aerial UEs comprises identifiers for downlink reference signal configurations that are configured for positioning aerial UEs.

Clause 81. The method of clause 80, wherein the information for aerial UEs further comprises an indication of a priority of the downlink reference signal configurations that are configured for positioning aerial UEs.

Clause 82. The method of clause 80, wherein the downlink reference signal configurations comprise downlink positioning resource sets.

Clause 83. A user equipment (UE) in a wireless network configured for positioning, the UE comprising: a wireless transceiver configured to communicate with entities in the wireless network; at least one memory; and at least one processor coupled to the wireless transceiver and the at least one memory and configured to: receive, via the wireless transceiver, positioning assistance data broadcast by a Transmission Reception Points (TRP), the positioning assistance data comprising information for aerial UEs and information for terrestrial UEs; and obtain, via the wireless transceiver, downlink measurements using the positioning assistance data.

Clause 84. The UE of clause 83, wherein the positioning assistance data is partitioned into a plurality of positioning System Information Blocks (posSIBs) broadcast by the TRP and wherein the information for the aerial UEs and information for the terrestrial UEs are received together in the posSIBs.

Clause 85. The UE of clause 83, wherein the positioning assistance data is partitioned into a plurality of positioning System Information Blocks (posSIBs) broadcast by the TRP and wherein the information for the aerial UEs and information for the terrestrial UEs are received separately in different posSIBs.

Clause 86. The UE of clause 85, wherein the UE is an aerial UE, wherein the at least one processor is further configured to decode only the posSIBs that include the information for the aerial UEs.

Clause 87. The UE of clause 85, wherein the UE is a terrestrial UE, wherein the at least one processor is further configured to decode only the posSIBs that include the information for the terrestrial UEs.

Clause 88. The UE of any of clauses 83-87, wherein the UE is an aerial UE and accesses the information for the aerial UEs based on a subscription.

Clause 89. The UE of any of clauses 83-88, wherein the UE is an aerial UE, wherein the at least one processor is further configured to: determine a vertical coordinate for the aerial UE; determine if the vertical coordinate for the aerial UE is greater than a threshold; wherein the information for the aerial UEs is accessed if the vertical coordinate for the aerial UE is greater than the threshold and the information for the terrestrial UEs is accessed if the vertical coordinate for the aerial UE is less than the threshold.

Clause 90. The UE of any of clauses 83-89, wherein the positioning assistance data comprises a first list of positioning assistance data per frequency layer for aerial UEs that is different than a second list of positioning assistance data per frequency layer for terrestrial UEs.

Clause 91. The UE of clause 90, wherein the information for aerial UEs comprises a first set of TRPs that are configured for positioning aerial UEs and downlink reference signal configurations per TRP in the first set of TRPs, wherein the first set of TRPs and downlink reference signal configurations per TRP is listed separately from a second set of TRPs and downlink reference signal configurations per TRP that are configured for positioning terrestrial UEs.

Clause 92. The UE of any of clauses 83-91, wherein the information for aerial UEs comprises a first set of downlink reference signal configurations per TRP that are configured for positioning aerial UEs, wherein the first set of downlink reference signal configurations per TRP is listed separately from a second set of downlink reference signal configurations per TRP that are configured for positioning terrestrial UEs.

Clause 93. The UE of any of clauses 83-92, wherein the positioning assistance data comprises a first set of TRPs that are configured for positioning both aerial UEs and terrestrial UEs, and the information for aerial UEs comprises identifiers for the TRPs that are configured for positioning aerial UEs from the first set of TRPs.

Clause 94. The UE of clause 93, wherein the information for aerial UEs further comprises an indication of a priority of the TRPs that are configured for positioning aerial UEs.

Clause 95. The UE of clause 93, wherein the positioning assistance data further comprises a second set of TRPs that are configured for positioning only aerial UEs.

Clause 96. The UE of clause 95, wherein the information for aerial UEs further comprises an indication of a priority of TRPs that are configured for positioning aerial UEs in the first set of TRPs and the TRPs in the second set of TRPs.

Clause 97. The UE of any of clauses 83-96, wherein the positioning assistance data comprises a first set of TRPs that are configured for positioning both aerial UEs and terrestrial UEs and an indication of a priority of the TRPs that are configured for positioning aerial UEs.

Clause 98. The UE of any of clauses 83-97, wherein the positioning assistance data comprises downlink reference signal configurations per TRPs, and wherein the information for the aerial UEs comprises identifiers for downlink reference signal configurations that are configured for positioning aerial UEs.

Clause 99. The UE of clause 98, wherein the information for aerial UEs further comprises an indication of a priority of the downlink reference signal configurations that are configured for positioning aerial UEs.

Clause 100. The UE of clause 98, wherein the downlink reference signal configurations comprise downlink positioning resource sets.

Clause 101. A user equipment (UE) in a wireless network configured for positioning, comprising: means for receiving positioning assistance data broadcast by a Transmission Reception Points (TRP), the positioning assistance data comprising information for aerial UEs and information for terrestrial UEs; and means for obtaining downlink measurements using the positioning assistance data.

Clause 102. The UE of clause 101, wherein the positioning assistance data is partitioned into a plurality of positioning System Information Blocks (posSIBs) broadcast by the TRP and wherein the information for the aerial UEs and information for the terrestrial UEs are received together in the posSIBs.

Clause 103. The UE of clause 101, wherein the positioning assistance data is partitioned into a plurality of positioning System Information Blocks (posSIBs) broadcast by the TRP and wherein the information for the aerial UEs and information for the terrestrial UEs are received separately in different posSIBs.

Clause 104. The UE of clause 103, wherein the UE is an aerial UE, the aerial UE further comprising means for decoding only the posSIBs that include the information for the aerial UEs.

Clause 105. The UE of clause 103, wherein the UE is a terrestrial UE, the terrestrial UE further comprising means for decoding only the posSIBs that include the information for the terrestrial UEs.

Clause 106. The UE of any of clauses 101-105, wherein the UE is an aerial UE and accesses the information for the aerial UEs based on a subscription.

Clause 107. The UE of any of clauses 101-106, wherein the UE is an aerial UE, the aerial UE further comprising: means for determining a vertical coordinate for the aerial UE; means for determining if the vertical coordinate for the aerial UE is greater than a threshold; wherein the information for the aerial UEs is accessed if the vertical coordinate for the aerial UE is greater than the threshold and the information for the terrestrial UEs is accessed if the vertical coordinate for the aerial UE is less than the threshold.

Clause 108. The UE of any of clauses 101-107, wherein the positioning assistance data comprises a first list of positioning assistance data per frequency layer for aerial UEs that is different than a second list of positioning assistance data per frequency layer for terrestrial UEs.

Clause 109. The UE of clause 108, wherein the information for aerial UEs comprises a first set of TRPs that are configured for positioning aerial UEs and downlink reference signal configurations per TRP in the first set of TRPs, wherein the first set of TRPs and downlink reference signal configurations per TRP is listed separately from a second set of TRPs and downlink reference signal configurations per TRP that are configured for positioning terrestrial UEs.

Clause 110. The UE of any of clauses 101-109, wherein the information for aerial UEs comprises a first set of downlink reference signal configurations per TRP that are configured for positioning aerial UEs, wherein the first set of downlink reference signal configurations per TRP is listed separately from a second set of downlink reference signal configurations per TRP that are configured for positioning terrestrial UEs.

Clause 111. The UE of any of clauses 101-110, wherein the positioning assistance data comprises a first set of TRPs that are configured for positioning both aerial UEs and terrestrial UEs, and the information for aerial UEs comprises identifiers for the TRPs that are configured for positioning aerial UEs from the first set of TRPs.

Clause 112. The UE of clause 111, wherein the information for aerial UEs further comprises an indication of a priority of the TRPs that are configured for positioning aerial UEs.

Clause 113. The UE of clause 111, wherein the positioning assistance data further comprises a second set of TRPs that are configured for positioning only aerial UEs.

Clause 114. The UE of clause 113, wherein the information for aerial UEs further comprises an indication of a priority of TRPs that are configured for positioning aerial UEs in the first set of TRPs and the TRPs in the second set of TRPs.

Clause 115. The UE of any of clauses 101-114, wherein the positioning assistance data comprises a first set of TRPs that are configured for positioning both aerial UEs and terrestrial UEs and an indication of a priority of the TRPs that are configured for positioning aerial UEs.

Clause 116. The UE of any of clauses 101-115, wherein the positioning assistance data comprises downlink reference signal configurations per TRPs, and wherein the information for the aerial UEs comprises identifiers for downlink reference signal configurations that are configured for positioning aerial UEs.

Clause 117. The UE of clause 116, wherein the information for aerial UEs further comprises an indication of a priority of the downlink reference signal configurations that are configured for positioning aerial UEs.

Clause 118. The UE of clause 116, wherein the downlink reference signal configurations comprise downlink positioning resource sets.

Clause 119. A non-transitory storage medium including program code stored thereon, the program code is operable to configure at least one processor in a user equipment (UE) in a wireless network for positioning, the program code comprising instruction to: receive positioning assistance data broadcast by a Transmission Reception Points (TRP), the positioning assistance data comprising information for aerial UEs and information for terrestrial UEs; and obtain downlink measurements using the positioning assistance data.

Clause 120. The non-transitory storage medium of clause 119, wherein the positioning assistance data is partitioned into a plurality of positioning System Information Blocks (posSIBs) broadcast by the TRP and wherein the information for the aerial UEs and information for the terrestrial UEs are received together in the posSIBs.

Clause 121. The non-transitory storage medium of clause 119, wherein the positioning assistance data is partitioned into a plurality of positioning System Information Blocks (posSIBs) broadcast by the TRP and wherein the information for the aerial UEs and information for the terrestrial UEs are received separately in different posSIBs.

Clause 122. The non-transitory storage medium of clause 121, wherein the UE is an aerial UE, wherein the program code further comprises instruction to decode only the posSIBs that include the information for the aerial UEs.

Clause 123. The non-transitory storage medium of clause 121, wherein the UE is a terrestrial UE, wherein the program code further comprises instructions to decode only the posSIBs that include the information for the terrestrial UEs.

Clause 124. The non-transitory storage medium of any of clauses 119-123, wherein the UE is an aerial UE and accesses the information for the aerial UEs based on a subscription.

Clause 125. The non-transitory storage medium of any of clauses 119-124, wherein the UE is an aerial UE, wherein the program code further comprises instructions to: determine a vertical coordinate for the aerial UE; determine if the vertical coordinate for the aerial UE is greater than a threshold; wherein the information for the aerial UEs is accessed if the vertical coordinate for the aerial UE is greater than the threshold and the information for the terrestrial UEs is accessed if the vertical coordinate for the aerial UE is less than the threshold.

Clause 126. The non-transitory storage medium of any of clauses 119-125, wherein the positioning assistance data comprises a first list of positioning assistance data per frequency layer for aerial UEs that is different than a second list of positioning assistance data per frequency layer for terrestrial UEs.

Clause 127. The non-transitory storage medium of clause 126, wherein the information for aerial UEs comprises a first set of TRPs that are configured for positioning aerial UEs and downlink reference signal configurations per TRP in the first set of TRPs, wherein the first set of TRPs and downlink reference signal configurations per TRP is listed separately from a second set of TRPs and downlink reference signal configurations per TRP that are configured for positioning terrestrial UEs.

Clause 128. The non-transitory storage medium of any of clauses 119-127, wherein the information for aerial UEs comprises a first set of downlink reference signal configurations per TRP that are configured for positioning aerial UEs, wherein the first set of downlink reference signal configurations per TRP is listed separately from a second set of downlink reference signal configurations per TRP that are configured for positioning terrestrial UEs.

Clause 129. The non-transitory storage medium of any of clauses 119-128, wherein the positioning assistance data comprises a first set of TRPs that are configured for positioning both aerial UEs and terrestrial UEs, and the information for aerial UEs comprises identifiers for the TRPs that are configured for positioning aerial UEs from the first set of TRPs.

Clause 130. The non-transitory storage medium of clause 129, wherein the information for aerial UEs further comprises an indication of a priority of the TRPs that are configured for positioning aerial UEs.

Clause 131. The non-transitory storage medium of clause 129, wherein the positioning assistance data further comprises a second set of TRPs that are configured for positioning only aerial UEs.

Clause 132. The non-transitory storage medium of clause 131, wherein the information for aerial UEs further comprises an indication of a priority of TRPs that are configured for positioning aerial UEs in the first set of TRPs and the TRPs in the second set of TRPs.

Clause 133. The non-transitory storage medium of any of clauses 119-132, wherein the positioning assistance data comprises a first set of TRPs that are configured for positioning both aerial UEs and terrestrial UEs and an indication of a priority of the TRPs that are configured for positioning aerial UEs.

Clause 134. The non-transitory storage medium of any of clauses 119-133, wherein the positioning assistance data comprises downlink reference signal configurations per TRPs, and wherein the information for the aerial UEs comprises identifiers for downlink reference signal configurations that are configured for positioning aerial UEs.

Clause 135. The non-transitory storage medium of clause 134, wherein the information for aerial UEs further comprises an indication of a priority of the downlink reference signal configurations that are configured for positioning aerial UEs.

Clause 136. The non-transitory storage medium of clause 134, wherein the downlink reference signal configurations comprise downlink positioning resource sets.

Therefore, it is intended that claimed subject matter not be limited to the particular examples disclosed, but that such claimed subject matter may also include all aspects falling within the scope of appended claims, and equivalents thereof.

What is claimed is:

1. A method performed by a network entity in a wireless network for positioning one or more user equipments (UEs) including an aerial UE, the method comprising:
    obtaining positioning assistance data to be broadcast by one or more Transmission Reception Points (TRPs), the positioning assistance data comprising information for aerial UEs and information for terrestrial UEs; and
    sending the positioning assistance data;
    wherein the positioning assistance data comprises a first list of positioning assistance data per frequency layer for aerial UEs that is different than a second list of positioning assistance data per frequency layer for terrestrial UEs.

2. The method of claim 1, wherein the network entity is a location server, and obtaining positioning assistance comprises configuring the positioning assistance data, and wherein the positioning assistance data is sent to one or more TRPs for broadcasting.

3. The method of claim 1, wherein the network entity is a TRP, and obtaining the positioning assistance comprises receiving the positioning assistance data from a location server, and sending the positioning assistance data comprises broadcasting the positioning assistance data.

4. The method of claim 1, wherein the positioning assistance data is partitioned into a plurality of positioning System Information Blocks (posSIBs) and wherein the information for the aerial UEs and information for the terrestrial UEs are provided together in the posSIBs.

5. The method of claim 1, wherein the positioning assistance data is partitioned into a plurality of positioning System Information Blocks (posSIBs) and wherein the information for the aerial UEs and information for the terrestrial UEs are provided separately in different posSIBs.

6. The method of claim 1, wherein the information for aerial UEs comprises a first set of downlink reference signal configurations per TRP that are configured for positioning aerial UEs, wherein the first set of downlink reference signal configurations per TRP is listed separately from a second set of downlink reference signal configurations per TRP that are configured for positioning terrestrial UEs.

7. The method of claim 1, wherein the positioning assistance data comprises a first set of TRPs that are configured for positioning both aerial UEs and terrestrial UEs, and the information for aerial UEs comprises identifiers for the TRPs that are configured for positioning aerial UEs from the first set of TRPs.

8. The method of claim 1, wherein the positioning assistance data comprises a first set of TRPs that are configured for positioning both aerial UEs and terrestrial UEs and an indication of a priority of the TRPs that are configured for positioning aerial UEs.

9. The method of claim 1, wherein the positioning assistance data comprises downlink reference signal configurations per TRPs, and wherein the information for the aerial UEs comprises identifiers for downlink reference signal configurations that are configured for positioning aerial UEs.

10. A network entity in a wireless network configured for positioning one or more user equipments (UEs) including an aerial UE, comprising:
    an external interface;
    at least one memory; and
    at least one processor coupled to the external interface and the at least one memory and configured to:
    obtain, via the external interface, positioning assistance data to be broadcast by one or more Transmission Reception Points (TRPs), the positioning assistance data comprising information for aerial UEs and information for terrestrial UEs; and
    send, via the external interface, the positioning assistance data;
    wherein the positioning assistance data comprises a first list of positioning assistance data per frequency layer for aerial UEs that is different than a second list of positioning assistance data per frequency layer for terrestrial UEs.

11. The network entity of claim 10, wherein the network entity is a location server, and the at least one processor is configured to obtain positioning assistance by being configured to configure the positioning assistance data, and wherein the positioning assistance data is sent to one or more TRPs for broadcasting.

12. The network entity of claim 10, wherein the network entity is a TRP, and the at least one processor is configured to obtain the positioning assistance by being configured to receive, via the external interface, the positioning assistance data from a location server, and the at least one processor is configured to send the positioning assistance data by being configured to broadcast the positioning assistance data.

13. The network entity of claim 10, wherein the positioning assistance data is partitioned into a plurality of positioning System Information Blocks (posSIBs) and wherein the information for the aerial UEs and information for the terrestrial UEs are provided together in the posSIBs.

14. The network entity of claim 10, wherein the positioning assistance data is partitioned into a plurality of positioning System Information Blocks (posSIBs) and wherein the information for the aerial UEs and information for the terrestrial UEs are provided separately in different posSIBs.

15. The network entity of claim 10, wherein the information for aerial UEs comprises a first set of downlink reference signal configurations per TRP that are configured for positioning aerial UEs, wherein the first set of downlink reference signal configurations per TRP is listed separately from a second set of downlink reference signal configurations per TRP that are configured for positioning terrestrial UEs.

16. The network entity of claim 10, wherein the positioning assistance data comprises a first set of TRPs that are configured for positioning both aerial UEs and terrestrial UEs, and the information for aerial UEs comprises identifiers for the TRPs that are configured for positioning aerial UEs from the first set of TRPs.

17. The network entity of claim 10, wherein the positioning assistance data comprises a first set of TRPs that are configured for positioning both aerial UEs and terrestrial UEs and an indication of a priority of the TRPs that are configured for positioning aerial UEs.

18. The network entity of claim 10, wherein the positioning assistance data comprises downlink reference signal configurations per TRPs, and wherein the information for the aerial UEs comprises identifiers for downlink reference signal configurations that are configured for positioning aerial UEs.

19. A method performed by a user equipment (UE) in a wireless network for positioning, the method comprising:
   receiving positioning assistance data broadcast by a Transmission Reception Points (TRP), the positioning assistance data comprising information for aerial UEs and information for terrestrial UEs; and
   obtaining downlink measurements using the positioning assistance data;
   wherein the positioning assistance data comprises a first list of positioning assistance data per frequency layer for aerial UEs that is different than a second list of positioning assistance data per frequency layer for terrestrial UEs.

20. The method of claim 19, wherein the positioning assistance data is partitioned into a plurality of positioning System Information Blocks (posSIBs) broadcast by the TRP and wherein the information for the aerial UEs and information for the terrestrial UEs are received together in the posSIBs.

21. The method of claim 19, wherein the positioning assistance data is partitioned into a plurality of positioning System Information Blocks (posSIBs) broadcast by the TRP and wherein the information for the aerial UEs and information for the terrestrial UEs are received separately in different posSIBs.

22. The method of claim 19, wherein the UE is an aerial UE and accesses the information for the aerial UEs based on a subscription.

23. The method of claim 19, wherein the UE is an aerial UE, the method further comprising:
   determining a vertical coordinate for the aerial UE;
   determining if the vertical coordinate for the aerial UE is greater than a threshold;
   wherein the information for the aerial UEs is accessed if the vertical coordinate for the aerial UE is greater than the threshold and the information for the terrestrial UEs is accessed if the vertical coordinate for the aerial UE is less than the threshold.

24. The method of claim 19, wherein the information for aerial UEs comprises a first set of downlink reference signal configurations per TRP that are configured for positioning aerial UEs, wherein the first set of downlink reference signal configurations per TRP is listed separately from a second set of downlink reference signal configurations per TRP that are configured for positioning terrestrial UEs.

25. The method of claim 19, wherein the positioning assistance data comprises a first set of TRPs that are configured for positioning both aerial UEs and terrestrial UEs, and the information for aerial UEs comprises identifiers for the TRPs that are configured for positioning aerial UEs from the first set of TRPs.

26. The method of claim 19, wherein the positioning assistance data comprises a first set of TRPs that are configured for positioning both aerial UEs and terrestrial UEs and an indication of a priority of the TRPs that are configured for positioning aerial UEs.

27. The method of claim 19, wherein the positioning assistance data comprises downlink reference signal configurations per TRPs, and wherein the information for the aerial UEs comprises identifiers for downlink reference signal configurations that are configured for positioning aerial UEs.

28. A user equipment (UE) in a wireless network configured for positioning, the UE comprising:
   a wireless transceiver configured to communicate with entities in the wireless network;
   at least one memory; and
   at least one processor coupled to the wireless transceiver and the at least one memory and configured to:
   receive, via the wireless transceiver, positioning assistance data broadcast by a Transmission Reception Points (TRP), the positioning assistance data comprising information for aerial UEs and information for terrestrial UEs; and
   obtain, via the wireless transceiver, downlink measurements using the positioning assistance data;
   wherein the positioning assistance data comprises a first list of positioning assistance data per frequency layer for aerial UEs that is different than a second list of positioning assistance data per frequency layer for terrestrial UEs.

29. The UE of claim 28, wherein the positioning assistance data is partitioned into a plurality of positioning System Information Blocks (posSIBs) broadcast by the TRP and wherein the information for the aerial UEs and information for the terrestrial UEs are received together in the posSIBs.

30. The UE of claim 28, wherein the positioning assistance data is partitioned into a plurality of positioning System Information Blocks (posSIBs) broadcast by the TRP and wherein the information for the aerial UEs and information for the terrestrial UEs are received separately in different posSIBs.

31. The UE of claim 28, wherein the UE is an aerial UE and accesses the information for the aerial UEs based on a subscription.

32. The UE of claim 28, wherein the UE is an aerial UE, wherein the at least one processor is further configured to:
   determine a vertical coordinate for the aerial UE;
   determine if the vertical coordinate for the aerial UE is greater than a threshold;
   wherein the information for the aerial UEs is accessed if the vertical coordinate for the aerial UE is greater than the threshold and the information for the terrestrial UEs is accessed if the vertical coordinate for the aerial UE is less than the threshold.

33. The UE of claim 28, wherein the information for aerial UEs comprises a first set of downlink reference signal configurations per TRP that are configured for positioning aerial UEs, wherein the first set of downlink reference signal configurations per TRP is listed separately from a second set of downlink reference signal configurations per TRP that are configured for positioning terrestrial UEs.

34. The UE of claim 28, wherein the positioning assistance data comprises a first set of TRPs that are configured for positioning both aerial UEs and terrestrial UEs, and the information for aerial UEs comprises identifiers for the TRPs that are configured for positioning aerial UEs from the first set of TRPs.

35. The UE of claim 28, wherein the positioning assistance data comprises a first set of TRPs that are configured for positioning both aerial UEs and terrestrial UEs and an indication of a priority of the TRPs that are configured for positioning aerial UEs.

36. The UE of claim 28, wherein the positioning assistance data comprises downlink reference signal configurations per TRPs, and wherein the information for the aerial UEs comprises identifiers for downlink reference signal configurations that are configured for positioning aerial UEs.

* * * * *